US012309397B2

(12) United States Patent
Tsukuba

(10) Patent No.: US 12,309,397 B2
(45) Date of Patent: May 20, 2025

(54) IMAGE PROCESSING APPARATUS AND METHOD

(71) Applicant: Sony Group Corporation, Tokyo (JP)

(72) Inventor: Takeshi Tsukuba, Tokyo (JP)

(73) Assignee: Sony Group Corporation, Tokyo (JP)

( * ) Notice: Subject to any disclaimer, the term of this patent is extended or adjusted under 35 U.S.C. 154(b) by 317 days.

(21) Appl. No.: 17/782,173

(22) PCT Filed: Jan. 22, 2021

(86) PCT No.: PCT/JP2021/002296
§ 371 (c)(1),
(2) Date: Jun. 3, 2022

(87) PCT Pub. No.: WO2021/149812
PCT Pub. Date: Jul. 29, 2021

(65) Prior Publication Data
US 2023/0045106 A1    Feb. 9, 2023

Related U.S. Application Data

(60) Provisional application No. 62/965,767, filed on Jan. 24, 2020.

(51) Int. Cl.
*H04N 19/00* (2014.01)
*G06T 5/92* (2024.01)
(Continued)

(52) U.S. Cl.
CPC ............. *H04N 19/186* (2014.11); *G06T 5/92* (2024.01); *G06T 11/001* (2013.01); *G06T 11/60* (2013.01)

(58) Field of Classification Search
CPC ....... H04N 19/186; G06T 5/92; G06T 11/001; G06T 11/60
See application file for complete search history.

(56) References Cited

U.S. PATENT DOCUMENTS

2016/0227224 A1\*  8/2016  Hsieh ..................... H04N 19/96
2019/0104322 A1\*  4/2019  Tsukuba ................. H04N 19/61

FOREIGN PATENT DOCUMENTS

CN    107211151 A    9/2017
CN    109076222 A    12/2018
(Continued)

OTHER PUBLICATIONS

De Lagrange (Interdigital) P et al: "ACT: common text for bug fixes and transform change", 17. JVET Meeting; Jan. 7, 2020-Jan. 17, 2020; Brussels; (The Joint Video Exploration Team of ISO/IEC JTC1/SC29/WG11 and ITU-T SG.16), No. JVET-Q0820 ; m52881 Jan. 16, 2020 (Jan. 16, 2020), XP030224269, Retrieved from the Internet: URL:http://phenix.int-evry.fr/jvet/doc_end_user/documents/17_Brussels/wg11/JVET-Q0820-v2.zip JVET-Q0820-v2.docx[retrieved on Jan. 16, 2020].

(Continued)

*Primary Examiner* — Zhihan Zhou
(74) *Attorney, Agent, or Firm* — XSENSUS LLP

(57) ABSTRACT

The present disclosure relates to an image processing apparatus and method capable of suppressing an increase in load of inverse adaptive color transform processing while suppressing an increase in distortion of coefficient data subjected to inverse adaptive color transform.

The coefficient data subjected to the lossless adaptive color transform is clipped at a level based on a bit depth of the coefficient data, and the coefficient data clipped at the level is subjected to lossless inverse adaptive color transform. The present disclosure may be applied to, for example, an image processing apparatus, an image coding device, an image decoding device, a transmission device, a reception device, a transmission/reception device, an information processing device, an imaging device, a reproduction device, an elec- (Continued)

tronic device, an image processing method, an information processing method, or the like.

20 Claims, 14 Drawing Sheets

(51) Int. Cl.
　　　*G06T 11/00*　　　(2006.01)
　　　*G06T 11/60*　　　(2006.01)
　　　*H04N 19/186*　　(2014.01)

(56) References Cited

FOREIGN PATENT DOCUMENTS

WO　　　　2016/123232 A1　　8/2016
WO　　　WO-2017195476 A1 *　11/2017　............. H04N 19/12

OTHER PUBLICATIONS

International Search Report and Written Opinion mailed on Apr. 6, 2021, received for PCT Application PCT/JP2021/002296, filed on Jan. 22, 2021, 18 pages including English Translation.

Bross et al., "Versatile Video Coding (Draft 7)", Joint Video Experts Team (JVET) of ITU-T SG 16 WP 3 and ISO/IEC JTC 1/SC 29/WG 11, JVET-P2001-vE, Oct. 1-11, 2019, pp. 1-465.

Chen et al., "Algorithm description for Versatile Video Coding and Test Model 7 (VTM 7)", Joint Video Experts Team (JVET) of ITU-T SG 16 WP 3 and ISO/IEC JTC 1/SC 29/WG 11, JVET-P2002-v1, Oct. 1-11, 2019, pp. 1-89.

Xiu et al., "ACT colour conversion for both lossless and lossy coding", Joint Video Experts Team (JVET) of ITU-T SG 16 WP 3 and ISO/IEC JTC 1/SC 29/ WG 11, JVET-Q0510_r2, Jan. 7-17, 2020, pp. 1-8.

Xiu et al., "Mismatch on clipping input residuals to !ACT", Joint Video Experts Team (JVET) of ITU-T SG 16 WP 3 and ISO/IEC JTC 1/SC 29/WG 11, JVET-R0329, 18th Meeting: by teleconference, Apr. 15-24, 2020, pp. 1-2.

Xiu et al., "On clipping input residuals to !ACT", Joint Video Experts Team (JVET) of ITU-T SG 16 WP 3 and ISO/IEC JTC 1/SC 29/WG 11, 18th Meeting: by teleconference, JVET-R0355_r1, Apr. 15-24, 2020, pp. 1-5.

Xiu et al., "AHG16: Clipping residual samples for ACT", Joint Video Experts Team (JVET) of ITU-T SG 16 WP 3 and ISO/IEC JTC 1/SC 29/WG 11, JVET-Q0513_r2, Jan. 7-17, 2020, pp. 1-5.

ITU-T, "Advanced video coding for generic audiovisual services", Telecommunication Standardization Sector of ITU, H.264, Apr. 2017, pp. 1-787.

ITU-T, "High efficiency video coding", Telecommunication Standardization Sector of ITU, H.265, Feb. 2018, pp. 1-672.

* cited by examiner

IMAGE PROCESSING APPARATUS AND METHOD

CROSS-REFERENCE TO RELATED APPLICATIONS

The present application is based on PCT filing PCT/JP2021/002296, filed Jan. 22, 2021, which claims priority to U.S. Provisional Application No. 62/965,767 filed Jan. 24, 2020, the entire contents of each are incorporated herein by reference.

TECHNICAL FIELD

The present disclosure relates to an image processing apparatus and method, and more particularly, to an image processing apparatus and method capable of suppressing an increase in load of inverse adaptive color transform processing while suppressing an increase in distortion of coefficient data after inverse adaptive color transform.

BACKGROUND ART

Conventionally, there has been proposed a coding method for deriving a prediction residual of a moving image, performing coefficient transform, quantization, and coding (see, for example, Non-Patent Document 1 and Non-Patent Document 2). Furthermore, as a coding tool for improving coding efficiency in RGB 444, adaptive color transform (ACT) for transforming coefficient data in an RGB domain into coefficient data in the YCgCo domain has been proposed. Furthermore, a lossless method has been proposed as the adaptive color transform (see, for example, Non-Patent Document 3).

Meanwhile, in the lossy inverse adaptive color transform (inverse ACT), in order to suppress an increase in the load of the inverse adaptive color transform processing, it has been proposed to clip the coefficient data in the YCgCo domain serving as the input signal with [−2^bitDepth, 2^bitDepth−1] (see, for example, Non-Patent Document 4).

CITATION LIST

Non-Patent Document

Non-Patent Document 1 Benjamin Bross, Jianle Chen, Shan Liu, Ye-Kui Wang, "Versatile Video Coding (Draft 7)", JVET-P2001-vE, Joint Video Experts Team (JVET) of ITU-T SG 16 WP 3 and ISO/IEC JTC 1/SC 29/WG 11 16th Meeting:Feneva, CH, 1-11 Oct. 2019

Non-Patent Document 2 Jianle Chen, Yan Ye, Seung Hwan Kim, "Algorithm description for Versatile Video Coding and Test Model 7 (VTM 7)", JVET-P2002-v1, Joint Video Experts Team (JVET) of ITU-T SG 16 WP 3 and ISO/IEC JTC 1/SC 29/WG 11 16th Meeting:Geneva, CH, 1-11 Oct. 2019

Non-Patent Document 3 Xiaoyu Xiu, Yi-Wen Chen, Tsung-Chuan Ma, Hong-Jheng Jhu, Xianglin Wang, Jie Zhao, Hendry, Seethal Paluri, Seung Hwan Kim, Weijia Zhu, Jizheng Xu, Li Zhang, "ACT colour conversion for both lossless and lossy coding", JVET-Q0510_r2, Joint Video Experts Team (JVET) of ITU-T SG 16 WP 3 and ISO/IEC JTC 1/SC 29/WG 11 17th Meeting:Brussels, BE, 7-17 Jan. 2020

Non-Patent Document 4 Xiaoyu Xiu, Yi-Wen Chen, Tsung-Chuan Ma, Hong-Jheng Jhu, Xianglin Wang "AHG16: Clipping residual samples for ACT", JVET-Q0513_r2, Joint Video Experts Team (JVET) of ITU-T SG 16 WP 3 and ISO/IEC JTC 1/SC 29/WG 11 17th Meeting:Brussels, BE, 7-17 January 2020

SUMMARY OF THE INVENTION

Problems to be Solved by the Invention

However, a value range of the coefficient data in the YCgCo domain subjected to the lossless adaptive color transform is wider than that of the coefficient data of the YCgCo domain subjected to the adaptive color transform by the lossy method. Therefore, when the method described in Non-Patent Document 4 is applied to the lossless inverse adaptive color transform disclosed in Non-Patent Document 3, the coefficient data in the YCgCo domain changes by the clipping processing, and there is a possibility that the distortion of the coefficient data in the RGB domain after the inverse adaptive color transform increases.

The present disclosure has been made in view of such a situation, and an object of the present disclosure is to suppress an increase in load of the inverse adaptive color transform processing while suppressing an increase in distortion of coefficient data after inverse adaptive color transform.

Solutions to Problems

According to an aspect of the present technology, an image processing apparatus includes a clipping processing unit configured to clip coefficient data subjected to lossless adaptive color transform at a level based on a bit depth of the coefficient data, and an inverse adaptive color transform unit configured to performs inverse adaptive color transform on the coefficient data clipped at the level by the clip processing unit by the lossless method.

According to an aspect of the present technology, an image processing method includes clipping coefficient data subjected to lossless adaptive color transform at a level based on a bit depth of the coefficient data, and performing inverse adaptive color transform on the coefficient data clipped at the level by the lossless method.

According to an aspect of the present invention, in an image processing apparatus and method, the coefficient data subjected to the lossless adaptive color transform is clipped at a level based on a bit depth of the coefficient data, and the coefficient data clipped at the level is subjected to lossless inverse adaptive color transform.

MODE FOR CARRYING OUT THE INVENTION

Figure 1:
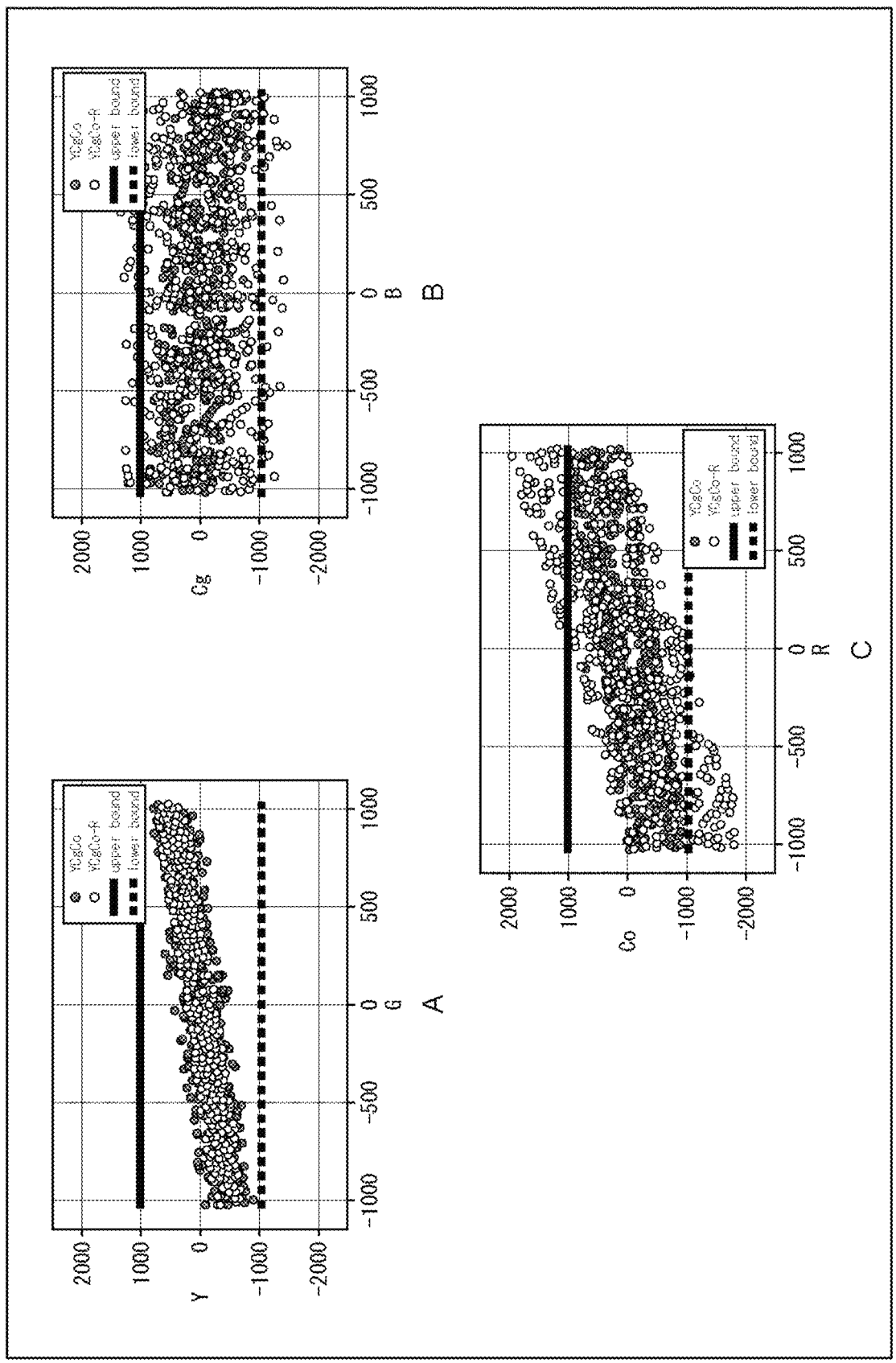
FIG. 1 is a diagram for describing an example of a difference in a value range between YCgCo conversion and YCgCo-R conversion.

Hereinafter, modes (hereinafter referred to as embodiments) for carrying out the present disclosure will be described. In addition, the embodiments will be described in the following order.

1. Clip processing for lossless inverse adaptive color transform
2. First embodiment (inverse adaptive color transform device)
3. Second embodiment (inverse quantization inverse conversion device)
4. Third embodiment (image decoding device)
5. Fourth Embodiment (image coding device)
6. Appendix 1. Clip Processing for Lossless Inverse Adaptive Color Transform <Document or the Like Supporting Technical Contents or Technical Terms>

The scope disclosed in the present technology includes not only the contents described in the embodiments but also the contents described in the following non-patent documents and the like known at the time of filing or the contents of other documents referred to in the following non-patent documents, and the like.

Non-Patent Document 1: (described above)
Non-Patent Document 2: (described above)
Non-Patent Document 3: (described above)
Non-Patent Document 4: (described above)
Non-Patent Document 5: Recommendation ITU-T H.264 (April 2017) "Advanced video coding for generic audiovisual services", April 2017
Non-Patent Document 6: Recommendation ITU-T H.265 (February 2018) "High efficiency video coding", February 2018

In other words, the content described in the above-described non-patent document is also a basis for determining support requirement. For example, even in a case where a quad-tree block structure and a quad tree plus binary tree (QTBT) block structure described in the above-described non-patent documents are not directly described in the examples, the quad-tree block structure and the quad tree plus binary tree (QTBT) block structure fall within the disclosure scope of the present technology and satisfy the support requirements of the claims. Furthermore, similarly, even if technical terms such as parsing, syntax, and semantics are not directly described in the examples, they are within the scope of disclosure of the present technology and satisfy the support requirements of the scope of the claims.

In addition, in the present specification, unless otherwise specified, a "block" (not a block indicating a processing unit) used as a partial area or a processing unit of an image (picture) indicates an arbitrary partial area in the picture, and a size, a shape, characteristics, and the like of the block are not limited. For example, the "block" includes any partial area (processing unit) such as a transform block (TB), a transform unit (TU), a prediction block (PB), a prediction unit (PU), a smallest coding unit (SCU), a coding unit (CU), a largest coding unit (LCU), a coding tree block (CTB), a coding tree unit (CTU), a sub-block, a macroblock, a tile, or a slice, which are described in the above-described non-patent literatures.

Further, when specifying a size of such a block, not only the block size may be directly specified, but also the block size may be indirectly specified. For example, the block size may be specified using identification information for identifying the size. Further, for example, the block size may be specified by a ratio or a difference with a size of a reference block (for example, LCU, SCU, or the like). For example, when transmitting information for specifying the block size as a syntax element or the like, information for indirectly specifying the size as described above may be used as the information. By doing so, the amount of the information can be reduced, and the coding efficiency may be improved. In addition, the specification of the block size also includes the specification of the range of the block size (for example, a specification or the like of a range of an allowable block size).

Further, in the present specification, the coding includes not only all processing of converting an image into a bitstream, but also a part of the processing. For example, the coding not only includes processing that includes prediction processing, orthogonal transform, quantization, arithmetic coding, or the like, but also includes processing that collectively refers to quantization and arithmetic coding, processing including prediction processing, quantization, and arithmetic coding, or the like. Similarly, the decoding includes not only all processing of converting a bitstream into an image, but also a part of the processing. For example, the decoding not only includes processing that includes inverse arithmetic decoding, inverse quantization, inverse orthogonal transform, prediction processing, or the like, but also processing that includes inverse arithmetic decoding and inverse quantization, inverse arithmetic decoding, inverse quantization, prediction processing, or the like.

<Adaptive Color Transform>

As a coding tool for improving coding efficiency in RGB 444, adaptive color transform (ACT) for transforming coefficient data in an RGB domain into coefficient data in the YCgCo domain has been proposed. The adaptive color transform is also referred to as YCgCo transform. Note that the inverse processing of the adaptive color transform is also referred to as inverse adaptive color transform (Inverse ACT). The inverse processing of the YCgCo transform is also called inverse YCgCo transform. The YCgCo transform (inverse YCgCo transform) is a lossy method. Therefore, in the YCgCo transform (inverse YCgCo transform), the transform between the coefficient data in the RGB domain and the coefficient data in the YCgCo domain can be lossy. In other words, by transforming the coefficient data in the RGB domain into YCgCo and then performing the inverse YCgCo transform, there is a probability that it is difficult to generate (restore) the coefficient data in the same RGB domain as the coefficient data in the RGB domain before the YCgCo transform.

On the other hand, in Non-Patent Document 3, a lossless method has been proposed as the adaptive color transform. The lossless adaptive color transform is also called YCgCo-R transform. The inverse processing of YCgCo-R transform is also called inverse YCgCo-R transform. That is, the YCgCo-R transform (inverse YCgCo-R transform) is a lossless method. Therefore, in the YCgCo-R transform (inverse YCgCo-R transform), it is possible to realize the lossless transform between the coefficient data in the RGB domain and the coefficient data in the YCgCo domain. In other words, by transforming the coefficient data in the RGB domain into the YCgCo-R and then performing the inverse YCgCo-R transform, there is a probability that it is possible to generate (restore) the coefficient data in the same RGB domain as the coefficient data in the RGB domain before the YCgCo-R transform.

Therefore, in the coding to which the adaptive color transform and the inverse adaptive color transform are applied, when the lossy YCgCo transform and the inverse YCgCo transform are applied, there is a possibility that it would be difficult to achieve the lossless coding. On the other hand, it is possible to realize lossless coding by applying the YCgCo-R transform and the inverse YCgCo-R transform.

<CgCo-R Transform and Inverse YCgCo-R Transform>

The YCgCo-R transform converts an RGB component into a YCgCo component as illustrated in Equations (1) to (4) below.

$$Co = R - B \quad (1)$$

$$t = B + (Co >> 1) \quad (2)$$

$$Cg = G - t \quad (3)$$

$$Y = t + (Cg >> 1) \quad (4)$$

By the YCgCo-R transform as shown in Equations (1) to (4), similarly to the case of the YCgCo transform, the coefficient data in the RGB domain can be converted into the coefficient data in the YCgCo domain corresponding to the YCbCr domain only by simple shift operation and addition/subtraction. The inverse YCgCo-R transform is performed as in the following Equations (5) to (8).

$$t = Y - (Cg >> 1) \quad (5)$$

$$G = Cg + t \quad (6)$$

$$B = t - (Co >> 1) \quad (7)$$

$$R = Co + B \quad (8)$$

<Clip Processing>

Meanwhile, Non-Patent Document 4 proposes that the coefficient data in the YCgCo domain as an input signal is clipped with [$-2^{bitDepth}$, $2^{bitDepth}-1$] in order to suppress the increase in the load of the inverse adaptive color transform processing in the lossy inverse adaptive color transform (Inverse ACT). The [A, B] represents a value range with A as a lower bound and B as an upper bound In addition, the 'clip with [A, B]' represents that a value equal to or smaller than the lower bound A of the input signal is A, and a value equal to or larger than the upper bound B is B. The bitDepth represents a bit depth of the coefficient data in the RGB domain before the adaptive color transform is performed.

For example, the value range of the coefficient data of the bit depth bitDepth is [$-2^{bitDepth}$, $2^{bitDepth}-1$]. When the coefficient data in the RGB domain in such a value range is subjected to the YCgCo transform, the value range of the coefficient data of each component in the YCgCo domain is theoretically within the range of [$-2^{bitDepth}$, $2^{bitDepth}-1$]. However, in practice, the coefficient data of each component in the YCgCo domain can take a value outside this value range due to an influence of some external factor or the like. In the inverse adaptive color transform processing, when the value range of the input signal is expanded as described above, the load of the inverse adaptive color transform processing may increase. In particular, in the case of mounting hardware, there is a possibility that the cost increases.

Therefore, the coefficient data of each component in the YCgCo domain as the input signal of the inverse YCgCo transform is clipped with [$-2^{bitDepth}$, $2^{bitDepth}-1$]. That is, the coefficient data $r_Y[x][y]$, $r_{Cb}[x][y]$, and $r_{Cb}[x][y]$, which are input signals for the inverse YCgCo transform, are processed as in the following Equations (9) to (11).

$$r_Y[x][y] = Clip3(-(1<<BitDepth),(1<<BitDepth)-1,r_Y[x][y]) \quad (9)$$

$$r_{Cb}[x][y] = Clip3(-(1<<BitDepth),(1<<BitDepth)-1,r_{Cb}[x][y]) \quad (10)$$

$$r_{Cr}[x][y] = Clip3(-(1<<BitDepth),(1<<BitDepth)-1,r_{Cr}[x][y]) \quad (11)$$

$r_Y[x][y]$ represents coefficient data of the Y component. $r_{Cb}[x][y]$ represents coefficient data of the Cg component. $r_{Cb}[x][y]$ represents coefficient data of the Co component Clip3 (A, B, C) represents a clip function for clipping C with the lower bound A and the upper bound B. << represents a bit shift (that is, a power of 2).

By doing so, in the inverse YCgCo transform, there is no need to consider processing at an unnecessary level outside this value range. Therefore, the increase in the load of the inverse adaptive color transform processing can be suppressed. In particular, in the case of implementing hardware, the increase in cost can be suppressed.

It is assumed that the coefficient data clipped in this way is inversely YCgCo-R transformed by the lossless method as described in Non-Patent Document 3. In that case, the coefficient data $r_Y[x][y]$, $r_{Cb}[x][y]$, and $r_{Cr}[x][y]$ processed as in Equations (9) to (11) are processed as in Equations (12) to (15) below.

$$tmp = r_Y[x][y] - (r_{Cb}[x][y] >> 1) \quad (12)$$

$$r_Y[x][y] = tmp + r_{Cb}[x][y] \quad (13)$$

$$r_{Cb}[x][y] = tmp - (r_{Cr}[x][y] >> 1) \quad (14)$$

$$r_{Cr}[x][y] += r_{Cb}[x][y] \quad (15)$$

Note that Equations (12) to (15) are equivalent to Equations (5) to (8) described above.

<Clip Processing in Adaptive Color Transform of Lossless Method>

However, in the case of the above-described lossless YCgCo-R transform, the value range of the transformed coefficient data is wider than that in the case of the YCgCo transform. For example, when the coefficient data of the bit depth bitDepth in the RGB domain is subjected to the YCgCo-R transform, the value range of the coefficient data of the Y component that is the luminance component is [$-2^{bitDepth}$, $2^{bitDepth}-1$]. The value range of the coefficient data of the Cg component and the Co component, which are color difference components, is [$-2^{(bitDepth+1)}$, $2^{(bitDepth+1)}-1$]. That is, the dynamic range of the coefficient data of the Y component is bitDepth+1, and the dynamic range of the coefficient data of the Cg component and the Co component is bitDepth+2.

Therefore, when the method described in Non-Patent Document 4 is applied to the lossless adaptive color transform disclosed in Non-Patent Document 3, the coefficient data in the YCgCo domain changes by the clip processing, and there is a possibility that the distortion of the coefficient data in the RGB domain after the inverse adaptive color transform increases. Note that this "distortion" represents inconsistency with the coefficient data in the RGB domain before the inverse adaptive color transform, that is, a difference between the coefficient data in the RGB domain before and after the inverse adaptive color transform. That is, in such a method, it may be difficult to realize the lossless transform between the coefficient data in the RGB domain and the coefficient data in the YCgCo domain.

FIG. 1 is a diagram illustrating an example of a relationship between an input value and an output value in a case where a residual signal in the RGB domain is subjected to the YCgCo transform or the YCgCo-R transform. It is assumed that the bit depth of the coefficient data in the RGB domain which is an input of the YCgCo transform and the YCgCo-R transform is 10 bits (bitDepth=10). It is assumed that the value range of the coefficient data in the RGB domain is [−2^bitDepth, 2^bitDepth−1].

A of FIG. 1 illustrates an example of a relationship between a G component (input value) and a Y component (output value). B of FIG. 1 illustrates an example of a relationship between the B component (input value) and the Cg component (output value). C of FIG. 1 illustrates an example of a relationship between an R component (input value) and a Co component (output value).

In FIG. 1, a gray circle represents an example of a relationship between an input value and an output value in the case of the YCgCo transform. A white circle represents an example of a relationship between an input value and an output value in the case of the YCgCo-R transform. A solid thick line represents an example of the upper bound of the clip. A dotted thick line represents an example of the lower bound of the clip. Here, the upper bound and the lower bound of the clip processing described in Non-Patent Document 4 are illustrated.

As illustrated in B of FIG. 1 and C of FIG. 1, it can be seen that the coefficient data of the Cg component and the coefficient data of the Co component after the YCgCo-R transform can exceed the upper bound and the lower bound of the clip. In such a case, by the clip processing, a value equal to or more than the upper bound is clipped to the upper bound, and a value equal to or less than the lower bound is clipped to the lower bound. That is, the values of some coefficient data change. Therefore, in the coefficient data after the inverse YCgCo-R transform, there is a possibility that a distortion (inconsistency with that before the YCgCo-R transform) increases.

Since the inverse adaptive color transform is lossy as described above, there is a possibility that it is difficult to implement lossless coding in coding to which the inverse adaptive color transform is applied. In addition, as the distortion of the coefficient data in the RGB domain after the inverse adaptive color transform increases, there is a possibility that the difference between the decoded image and the image before coding increases, and the quality of the decoded image decreases.

<Setting of Range of Clip Processing for Lossless Adaptive Color Transform>

Therefore, the coefficient data subjected to the adaptive color transform by the lossless method, which is the input of the inverse adaptive color transform by the lossless method, is clipped at a level based on the bit depth of the coefficient data.

For example, in an information processing method, the coefficient data subjected to the adaptive color transform by the lossless method is clipped at a level based on the bit depth of the coefficient data, and the coefficient data clipped at the level is subjected to the inverse adaptive color transform by the lossless method.

For example, an information processing apparatus includes a clip processing unit that clips the coefficient data subjected to the adaptive color transform by the lossless method at the level based on the bit depth of the coefficient data, and the inverse adaptive color transform unit that performs the inverse adaptive color transform by the lossless method on the coefficient data clipped at the level by the clip processing unit.

By doing so, the clipping can be performed on the input of the inverse adaptive color transform of the lossless method at a level at which the distortion of the coefficient data after the inverse adaptive color transform does not increase. Therefore, it is possible to suppress the increase in the load of the inverse adaptive color transform processing while suppressing the increase in the distortion of the coefficient data after the inverse adaptive color transform.

In particular, by setting an upper bound and a lower bound so that a value range between the upper bound and the lower bound of the clip processing includes a value range that can be theoretically obtained by the coefficient data subjected to the adaptive color transform by the lossless method (that is, so that the coefficient data is wider than the theoretically possible value range), it is possible to suppress the occurrence of the distortion of the coefficient data after the inverse adaptive color transform. That is, it is possible to suppress the increase in the load of the inverse adaptive color transform processing while realizing the lossless transform between the coefficient data in the RGB domain and the coefficient data in the YCgCo domain.

<Method 1>

In the clip processing, the luminance component and the color component (color difference component) of the coefficient data subjected to the adaptive color transform by the lossless method may be clipped at the same level The coefficient data subjected to the adaptive color transform by the lossless method includes a Y component that is a luminance component, a Cg component that is a color component (color difference component), and a Co component that is a color component (color difference component). That is, all these components may be clipped at the same level. In this way, the clip processing can be easily performed as compared with a case where the clipping is performed at a different level for each component, and the increase in the load can be suppressed.

<Method 1-1>

For example, a luminance component and a color component (color difference component) of the coefficient data subjected to the adaptive color transform by the lossless method may be clipped with, as an upper bound, a value obtained by subtracting 1 from a power of 2 with a value obtained by adding 1 to a bit depth of the coefficient data as a power index Furthermore, the luminance component and the color component (color difference component) of the coefficient data subjected to the adaptive color transform by the lossless method may be clipped with, as a lower bound, a value obtained by multiplying −1 by a power of 2 with a value obtained by adding 1 to the bit depth of the coefficient data as a power index. Further, both the clipping of the upper bound and the clipping of the lower bound may be performed.

For example, an upper bound actResMax of the clip processing performed on the coefficient data subjected to the adaptive color transform by the lossless method is set as in the following Equation (16) using a value obtained by adding 1 to the bit depth of the coefficient data. Furthermore, a lower bound actResMin of the clip processing performed on the coefficient data subjected to the adaptive color transform by the lossless method is set as in the following Equation (17) using a value obtained by adding 1 to the bit depth of the coefficient data.

$$\text{actResMax}=1<<(\text{BitDepth}+1)-1 \quad (16)$$

$$\text{actResMin}=-1<<(\text{BitDepth}+1) \quad (17)$$

That is, the upper bound actResMax is a value obtained by subtracting 1 from a power of 2 with a value obtained by adding 1 to the bit depth as a power index. In addition, the lower bound actResMin is a value obtained by multiplying −1 by a power of 2 with a value obtained by adding 1 to the bit depth as a power index. Then, as shown in the following Equations (18) to (20), the luminance component and the color component (color difference component) of the coefficient data subjected to the adaptive color transform by the lossless method are clipped using the upper bound actResMax and the lower bound actResMin.

$$r_Y[x][y]=\text{Clip3}(\text{actResMin},\text{actResMax},r_Y[x][y]) \quad (18)$$

$$r_{Cb}[x][y]=\text{Clip3}(\text{actResMin},\text{actResMax},r_{Cb}[x][y]) \quad (19)$$

$$r_{Cr}[x][y]=\text{Clip3}(\text{actResMin},\text{actResMax},r_{Cr}[x][y]) \quad (20)$$

Then, the coefficient data clipped in this way is subjected to inverse YCgCo-R transform as in Equations (12) to (15) described above to derive the coefficient data in the RGB domain.

By doing so, the value range between the upper bound and the lower bound of the clip processing can be made wider than the value range theoretically possible for the coefficient data subjected to the adaptive color transform by the lossless method. Therefore, by clipping with such upper bounds and lower bounds, it is possible to suppress the occurrence of distortion of the coefficient data after the inverse adaptive color transform. That is, it is possible to suppress the increase in the load of the inverse adaptive color transform processing while realizing the lossless transform between the coefficient data in the RGB domain and the coefficient data in the YCgCo domain.

<Method 1-2>

Furthermore, the clip processing may be performed in consideration of the dynamic range of the buffer For example, at the time of the clip processing, the coefficient data subjected to the adaptive color transform by the lossless method may be clipped at a level based on the bit depth and the dynamic range of the buffer that holds the coefficient data at the time of the inverse adaptive color transform. By clipping the coefficient data in consideration of the dynamic range (hardware limitation) of the buffer in this way, the occurrence of overflow of the buffer can be suppressed. In other words, since the dynamic range of the buffer can be set without considering the bit depth of the coefficient data to be held, the increase in the dynamic range of the buffer can be suppressed, and the increase in cost can be suppressed.

For example, the level to be clipped may be a value derived using a smaller one of the value based on the bit depth of the coefficient data subjected to the adaptive color transform by the lossless method and not based on the dynamic range of the buffer that holds the coefficient data and the value based on the dynamic range of the buffer and not based on the bit depth. As described above, by setting the upper bound and the lower bound using the smaller value (that is, the clip processing causes the coefficient data to have a narrower value range), it is possible to suppress the increase in the load of the inverse adaptive color transform processing while satisfying the hardware limitation of the buffer and suppressing the increase in the distortion of the coefficient data after the inverse adaptive color transform.

For example, the luminance component and the color component (color difference component) of the coefficient data subjected to the adaptive color transform by the lossless method may be clipped with, as an upper bound, a value obtained by subtracting 1 from a power of 2 with a smaller one of a value obtained by adding 1 to the bit depth of the coefficient data and a value obtained by subtracting 1 from a dynamic range of the buffer that holds the coefficient data as a power index.

Furthermore, the luminance component and the color component (color difference component) of the coefficient data subjected to the adaptive color transform by the lossless method may be clipped with, as a lower bound, a value obtained by multiplying −1 by a power of 2 with a smaller one of a value obtained by adding 1 to the bit depth of the coefficient data and a value obtained by subtracting 1 from the dynamic range of the buffer that holds the coefficient data as a power index. Further, both the clipping of the upper bound and the clipping of the lower bound may be performed.

For example, the upper bound actResMax of the clip processing performed on the coefficient data subjected to the adaptive color transform by the lossless method is set as in the following Equation (21) using a value obtained by adding 1 to the bit depth of the coefficient data and a value obtained by subtracting 1 from the dynamic range of the buffer that holds the coefficient data. Furthermore, the lower bound actResMin of the clip processing performed on the coefficient data subjected to the adaptive color transform by the lossless method is set as in the following Equation (22) using a value obtained by adding 1 to the bit depth of the coefficient data and a value obtained by subtracting 1 from the dynamic range of the buffer that holds the coefficient data.

$$\text{actResMax}=1<<(\min(\log 2\text{MaxDR}-1,\text{BitDepth}+1))-1 \quad (21)$$

$$\text{actResMin}=-1<<(\min(\log 2\text{MaxDR}-1,\text{BitDepth}+1)) \quad (22)$$

That is, the upper bound actResMax is a value obtained by subtracting 1 from a power of 2 with the smaller one of a value obtained by adding 1 to the bit depth and a value obtained by subtracting 1 from the dynamic range of the buffer that holds the coefficient data as a power index. Furthermore, the lower bound actResMin is a value obtained by multiplying −1 by a power of 2 with the smaller one of a value obtained by adding 1 to the bit depth and a value obtained by subtracting 1 from the dynamic range of the buffer that holds the coefficient data as a power index. Then, the luminance component and the color component (color difference component) of the coefficient data subjected to the adaptive color transform by the lossless method are clipped using the upper bound actResMax and the lower bound actResMin as shown in Equations (18) to (20) described above.

Then, the coefficient data clipped in this way is subjected to inverse YCgCo-R transform as in Equations (12) to (15) described above to derive the coefficient data in the RGB domain.

In this way, it is possible to suppress the increase in the load of the inverse adaptive color transform processing while satisfying the hardware limitation of the buffer and suppressing the increase in the distortion of the coefficient data after the inverse adaptive color transform.

<Method 2>

As described above in <clip processing in adaptive color transform of lossless method>, the value range of the coefficient data of the Cg component and the Co component which are color components (color difference components) is wider than the value range of the coefficient data of the Y component which is the luminance component.

Therefore, the luminance component and the color difference component of the coefficient data may be clipped at respective levels. For example, the luminance component of the coefficient data may be clipped at a first level, and the color component (color difference component) of the coefficient data may be clipped at a second level. In this way, since the coefficient data of each component can be clipped in the value range corresponding to the component, it is possible to further suppress the increase in the load of the inverse adaptive color transform processing while suppressing the increase in the distortion of the coefficient data after the inverse adaptive color transform.

For example, when the clipping is performed according to a component having a wide value range, the width of the clip (between the upper bound and the lower bound) becomes unnecessarily wide in a component having a narrower region, and a decrease in the load of the inverse adaptive color transform processing is suppressed. As described above, by clipping each component with a width corresponding to the component, the increase in the load of the inverse adaptive color transform processing can be further suppressed.

<Method 2-1>

The difference between the upper bound and the lower bound of the second level may be wider than the difference between the upper bound and the lower bound of the first level. As described above, the value range of the coefficient data of the Cg component and the Co component as the color difference components is wider than the value range of the coefficient data of the Y component as the luminance component. Therefore, by making the difference between the upper bound and the lower bound of the clip for the coefficient data of the Cg component and the Co component which are the color difference components wider than the difference between the upper bound and the lower bound of the clip for the coefficient data of the Y component which is the luminance component, it is possible to further suppress the increase in the load of the inverse adaptive color transform processing while suppressing the increase in the distortion of the coefficient data after the inverse adaptive color transform.

For example, the luminance component of the coefficient data subjected to the adaptive color transform by the lossless method may be clipped with, as the upper bound, a value obtained by subtracting 1 from a power of 2 with the bit depth of the coefficient data as the power index. Furthermore, the luminance component of the coefficient data subjected to the adaptive color transform by the lossless method may be clipped with, as the lower bound, a value obtained by multiplying −1 by a power of 2 with the bit depth of the coefficient data as the power index. Further, both such clips of the upper and lower bound of the luminance component may be performed. Furthermore, the color component (color difference component) of the coefficient data subjected to the adaptive color transform by the lossless method may be clipped with, as the upper bound, a value obtained by subtracting 1 from a power of 2 with a value obtained by adding 1 to the bit depth of the coefficient data as the power index. Furthermore, the color component (color difference component) of the coefficient data subjected to the adaptive color transform by the lossless method may be clipped with, as the lower bound, a value obtained by multiplying −1 by a power of 2 with a value obtained by adding 1 to the bit depth of the coefficient data as the power index. In addition, both the clip of the upper bound and the clip of the lower bound may be performed on the color component (color difference component). Furthermore, as described above, the clip of the upper bound and the clip of the lower bound may be all performed on each of the luminance component and the color component (color difference component).

For example, the upper bound actResMaxY of the clip processing performed on the luminance component of the coefficient data subjected to the adaptive color transform by the lossless method is set as in the following Equation (23) using the bit depth of the coefficient data. Furthermore, the lower bound actResMinY of the clip processing performed on the luminance component of the coefficient data subjected to the adaptive color transform by the lossless method is set as in the following Equation (24) using the bit depth of the coefficient data. Further, the upper bound actResMaxC of the clip processing performed on the color component (color difference component) of the coefficient data subjected to the adaptive color transform by the lossless method is set using the bit depth of the coefficient data as in the following Equation (25). Furthermore, the lower bound actResMinC of the clip processing performed on the color component (color difference component) of the coefficient data subjected to the adaptive color transform by the lossless method is set using the bit depth of the coefficient data as in the following Equation (26).

$$\text{actResMax}Y = 1 << \text{BitDepth} - 1 \qquad (23)$$

$$\text{actResMin}Y = -1 << \text{BitDepth} \qquad (24)$$

$$\text{actResMax}C = 1 << (\text{BitDepth}+1) - 1 \qquad (25)$$

$$\text{actResMin}C = -1 << (\text{BitDepth}+1) \qquad (26)$$

That is, the upper bound actResMaxY for the luminance component is a value obtained by subtracting 1 from a power of 2 with the bit depth as the power index. In addition, the lower bound actResMinY for the luminance component is a value obtained by multiplying −1 by a power of 2 with the bit depth as the power index. Then, the luminance component of the coefficient data subjected to the adaptive color transform by the lossless method is clipped with the upper bound actResMaxY and the lower bound actResMinY as expressed by the following Equation (27).

$$r_Y[x][y] = \text{Clip3}(\text{actResMin}Y, \text{actResMax}Y, r_Y[x][y]) \qquad (27)$$

In addition, the upper bound actResMaxC for the color component (color difference component) is set to a value obtained by subtracting 1 from a power of 2 with a value obtained by adding 1 to the bit depth as the power index. In addition, the lower bound actResMinC for the color component (color difference component) is set to a value obtained by multiplying −1 by a power of 2 with a value obtained by adding 1 to the bit depth as the power index.

Then, the color component (color difference component) of the coefficient data subjected to the adaptive color transform by the lossless method is clipped with the upper bound actResMaxC and the lower bound actResMinC as shown in the following Equations (28) and (29).

$$r_{Cb}[x][y]=\text{Clip3}(\text{actResMinC},\text{actResMaxC},r_{Cb}[x][y]) \quad (28)$$

$$r_{Cr}[x][y]=\text{Clip3}(\text{actResMinC},\text{actResMax},r_{Cr}[x][y]) \quad (29)$$

Then, the coefficient data clipped in this way is subjected to inverse YCgCo-R transform as in Equations (12) to (15) described above to derive the coefficient data in the RGB domain.

In this way, since the coefficient data of each component can be clipped in the value range corresponding to the component, it is possible to further suppress the increase in the load of the inverse adaptive color transform processing while suppressing the increase in the distortion of the coefficient data after the inverse adaptive color transform.

<Method 2-2>

Furthermore, the clip processing may be performed in consideration of the dynamic range of the buffer For example, at the time of the clip processing, the coefficient data subjected to the adaptive color transform by the lossless method may be clipped at a level based on the bit depth and the dynamic range of the buffer that holds the coefficient data at the time of the inverse adaptive color transform. That is, the first level and the second level may be values based on the bit depth of the coefficient data subjected to the adaptive color transform by the lossless method and the dynamic range of the buffer that stores the coefficient data, respectively. By clipping the coefficient data in consideration of the dynamic range (hardware limitation) of the buffer in this way, the occurrence of overflow of the buffer can be suppressed. In other words, since the dynamic range of the buffer can be set without considering the bit depth of the coefficient data to be held, the increase in the dynamic range of the buffer can be suppressed, and the increase in cost can be suppressed.

For example, the level at which the luminance component is clipped may be a value derived using the smaller one of the value based on the bit depth of the coefficient data subjected to the adaptive color transform by the lossless method and not based on the dynamic range of the buffer that holds the coefficient data and the value based on the dynamic range of the buffer and not based on the bit depth. Furthermore, the level at which the color component (color difference component) is clipped may be a value derived using the smaller one of a value based on a value obtained by adding 1 to the bit depth of the coefficient data subjected to the adaptive color transform by the lossless method and not based on the dynamic range of the buffer that holds the coefficient data and a value based on the dynamic range of the buffer and not based on the value obtained by adding 1 to the bit depth. As described above, by setting the upper bound and the lower bound using the smaller value (that is, the clip processing causes the coefficient data to have a narrower value range), it is possible to further suppress the increase in the load of the inverse adaptive color transform processing while satisfying the hardware limitation of the buffer and suppressing the increase in the distortion of each component of the coefficient data after the inverse adaptive color transform.

For example, the luminance component of the coefficient data may be clipped with, as the upper bound, a value obtained by subtracting 1 from a power of 2 with the smaller one of the bit depth of the coefficient data subjected to the adaptive color transform by the lossless method and a value obtained by subtracting 1 from the dynamic range of the buffer that holds the coefficient data as the power index. Furthermore, the luminance component of the coefficient data may be clipped with, as the lower bound, a value obtained by multiplying −1 by a power of 2 with the smaller one of the bit depth of the coefficient data subjected to the adaptive color transform by the lossless method and a value obtained by subtracting 1 from the dynamic range of the buffer that holds the coefficient data as the power index. Further, both such clips of the upper and lower bound of the luminance component may be performed.

Furthermore, the color component (color difference component) of the coefficient data subjected to the adaptive color transform by the lossless method may be clipped with, as the upper bound, a value obtained by subtracting 1 from a power of 2 with the smaller one of a value obtained by adding 1 to the bit depth of the coefficient data and a value obtained by subtracting 1 from the dynamic range of the buffer that holds the coefficient data as the power index. Furthermore, the color component (color difference component) of the coefficient data subjected to the adaptive color transform by the lossless method may be clipped with, as the lower bound, a value obtained by multiplying −1 by a power of 2 with the smaller one of a value obtained by adding 1 to the bit depth of the coefficient data and a value obtained by subtracting 1 from the dynamic range of the buffer that holds the coefficient data as the power index. In addition, both the clip of the upper bound and the clip of the lower bound may be performed on the color component (color difference component). Furthermore, as described above, the clip of the upper bound and the clip of the lower bound may be all performed on each of the luminance component and the color component (color difference component).

For example, the upper bound actResMaxY of the clip processing performed on the luminance component of the coefficient data subjected to the adaptive color transform by the lossless method is set as in the following Equation (30) using the bit depth of the coefficient data and a value obtained by subtracting 1 from the dynamic range of the buffer that holds the coefficient data. Furthermore, the lower bound actResMinY of the clip processing performed on the luminance component of the coefficient data subjected to the adaptive color transform by the lossless method is set as in the following Equation (31) using the bit depth of the coefficient data and a value obtained by subtracting 1 from the dynamic range of the buffer that holds the coefficient data. Furthermore, the upper bound actResMaxC of the clip processing performed on the color component (color difference component) of the coefficient data subjected to the adaptive color transform by the lossless method is set as in the following Equation (32) using a value obtained by adding 1 to the bit depth of the coefficient data and a value obtained by subtracting 1 from the dynamic range of the buffer that holds the coefficient data. Furthermore, the lower bound actResMinC of the clip processing performed on the color component (color difference component) of the coefficient data subjected to the adaptive color transform by the lossless method is set as in the following Equation (33) using a value obtained by adding 1 to the bit depth of the coefficient data and a value obtained by subtracting 1 from the dynamic range of the buffer that holds the coefficient data.

$$\text{actResMax}Y=1<<\log 2\text{MaxDR}-1,\text{BitDepth}))-1 \quad (30)$$

$$\text{actResMin}Y=-1<<(\min(\log 2\text{MaxDR}-1,\text{BitDepth})) \quad (31)$$

$$\text{actResMax}C=1<<(\min(\log 2\text{MaxDR}-1,\text{Bit-Depth}+1))-1 \qquad (32)$$

$$\text{actResMin}C=-1<<(\min(\log 2\text{MaxDR}-1,\text{Bit-Depth}+1)) \qquad (33)$$

That is, the upper bound actResMaxY for the luminance component is a value obtained by subtracting 1 from a power of 2 with the smaller one of the bit depth and a value obtained by subtracting 1 from the dynamic range of the buffer that holds the coefficient data as the power index. Furthermore, the lower bound actResMinY for the luminance component is a value obtained by multiplying −1 by a power of 2 with the smaller one of the bit depth and a value obtained by subtracting 1 from the dynamic range of the buffer that holds the coefficient data as the power index. Then, the luminance component of the coefficient data subjected to the adaptive color transform by the lossless method is clipped with the upper bound actResMaxY and the lower bound actResMinY, as shown in the above-described Equation (27).

In addition, the upper bound actResMaxC for the color component (color difference component) is a value obtained by subtracting 1 from a power of 2 with the smaller one of a value obtained by adding 1 to the bit depth and a value obtained by subtracting 1 from the dynamic range of the buffer that holds the coefficient data as the power index. Furthermore, the lower bound actResMinC for the color component (color difference component) is set to a value obtained by multiplying −1 by a power of 2 with the smaller one of a value obtained by adding 1 to the bit depth and a value obtained by subtracting 1 from the dynamic range of the buffer that holds the coefficient data as the power index. Then, the color component (color difference component) of the coefficient data subjected to the adaptive color transform by the lossless method is clipped with the upper bound actResMaxC and the lower bound actResMinC as shown in the above-described Equations (28) and (29).

Then, the coefficient data clipped in this way is subjected to inverse YCgCo-R transform as in Equations (12) to (15) described above to derive the coefficient data in the RGB domain.

By doing so, it is possible to further suppress the increase in the load of the inverse adaptive color transform processing while satisfying the hardware limitation of the buffer and suppressing the increase in the distortion of each component of the coefficient data after the inverse adaptive color transform.

<Method 3>

The coefficient data may be clipped at the level based on the dynamic range of the buffer that holds the coefficient data at the time of the inverse adaptive color transform. By clipping the coefficient data in consideration of the dynamic range (hardware limitation) of the buffer in this way, the occurrence of overflow of the buffer can be suppressed. In other words, since the dynamic range of the buffer can be set without considering the bit depth of the coefficient data to be held, the increase in the dynamic range of the buffer can be suppressed, and the increase in cost can be suppressed.

For example, the luminance component and the color component (color difference component) of the coefficient data may be clipped with, as the upper bound, a value obtained by subtracting 1 from a power of 2 with a value obtained by subtracting 1 from the dynamic range of the buffer that holds the coefficient data at the time of the inverse adaptive color transform as the power index. Furthermore, the luminance component and the color component (color difference component) of the coefficient data may be clipped with, as the lower bound, a value obtained by multiplying −1 by a power of 2 with a value obtained by subtracting 1 from the dynamic range of the buffer as the power index.

For example, the upper bound actResMax of the clip processing performed on the coefficient data subjected to the adaptive color transform by the lossless method is set as in the following Equation (34) using a value obtained by subtracting 1 from the dynamic range of the buffer. Furthermore, the lower bound actResMin of the clip processing performed on the coefficient data subjected to the adaptive color transform by the lossless method is set as in the following Equation (35) using a value obtained by subtracting 1 from the dynamic range of the buffer.

$$\text{actResMax}=1<<(\log 2\text{MaxDR}-1)-1 \qquad (34)$$

$$\text{actResMin}=-1<<(\log 2\text{MaxDR}-1) \qquad (35)$$

That is, the upper bound actResMax is a value obtained by subtracting 1 from a power of 2 with a value obtained by subtracting 1 from the dynamic range of the buffer as the power index. In addition, the lower bound actResMin is a value obtained by multiplying −1 by a power of 2 with a value obtained by subtracting 1 from the dynamic range of the buffer as the power index. Then, as shown in Equations (18) to (20) described above, the luminance component and the color component (color difference component) of the coefficient data subjected to the adaptive color transform by the lossless method are clipped with the upper bound actResMax and the lower bound actResMin.

Then, the coefficient data clipped in this way is subjected to inverse YCgCo-R transform as in Equations (12) to (15) described above to derive the coefficient data in the RGB domain.

By doing so, the hardware limitation of the buffer can be satisfied, and the occurrence of the overflow of the buffer can be suppressed. In addition, the increase in cost can be suppressed. Furthermore, since the value range of the coefficient data is limited by the clip processing, the increase in the load of the inverse adaptive color transform processing can be suppressed. Furthermore, in a case where the value range of the coefficient data is narrower than the dynamic range of the buffer, in this way, the increase in the distortion of the coefficient data after the inverse adaptive color transform can be suppressed.

<Application Example>

In addition, "Method 1", "Method 1-1", "Method 1-2", "Method 2", "Method 2-1", "Method 2-2", and "Method 3" described above may be selectively applied For example, the optimum method may be applied according to the predetermined application condition based on some kind of information such as input coefficient data, hardware specifications, and load conditions. For example, in a case where the dynamic range of the buffer is wider than the value range of the coefficient data, "Method 1-1" or "Method 2-1" may be applied. When the value range of the luminance component and the value range of the color component (color difference component) of the coefficient data are equal to each other, "Method 1", "Method 1-1", or "Method 1-2" may be applied.

In addition, in each method, either or both of the clip of the upper bound and the clip of the lower bound may be selectively applied. For example, when the lower bound of the clip is equal to or less than the lower bound of the value range of the coefficient data, the clip of the lower bound may be omitted (skipped). In addition, when the upper bound of the clip is equal to or larger than the upper bound of the value range of the coefficient data, the clip of the upper bound may be omitted (skipped).

Of course, these are examples, and the application conditions or the methods applied to each condition are not limited to these examples.

2. First Embodiment

<Inverse Adaptive Color Transform Device>

Figure 2:
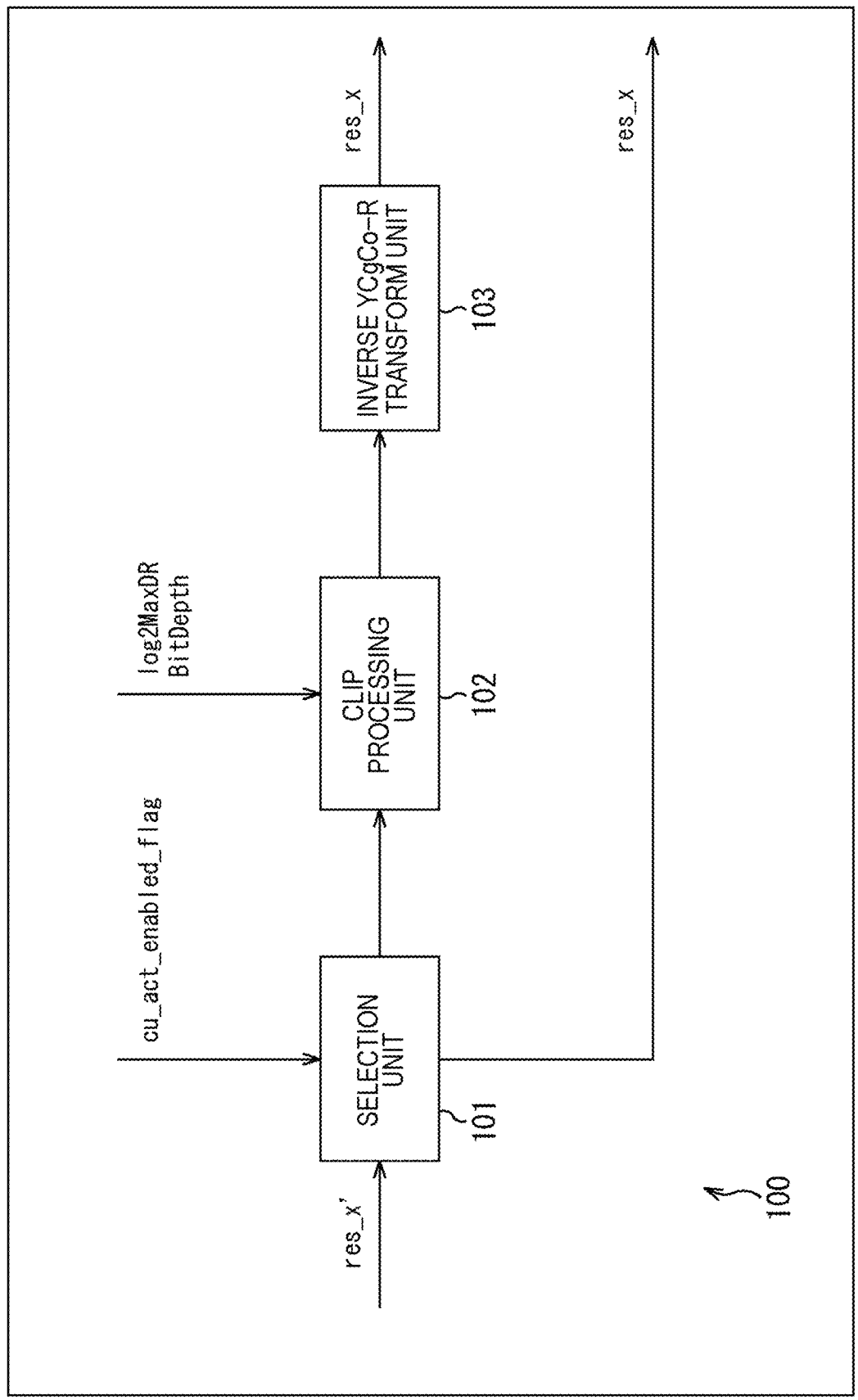
FIG. 2 is a block diagram illustrating a main configuration example of an inverse adaptive color transform device.

The above-described present technology can be applied to any device. FIG. 2 is a block diagram illustrating an example of a configuration of an inverse adaptive color transform device which is an aspect of an image processing apparatus to which the present technology is applied. An inverse adaptive color transform device 100 illustrated in FIG. 2 is a device that performs the inverse adaptive color transform (inverse YCgCo-R transform) of a lossless method on coefficient data of a YCgCo domain in which coefficient data in an RGB domain related to an image has been subjected to adaptive color transform (YCgCo-R transform) by the lossless method.

Note that, in FIG. 2, main processing units, data flows, and the like are illustrated, and those illustrated in FIG. 2 are not necessarily all. That is, in an inverse adaptive color transform device 100, there may be a processing unit not illustrated as a block in FIG. 2, or there may be processing or a data flow not illustrated as an arrow or the like in FIG. 2.

As illustrated in FIG. 2, the inverse adaptive color transform device 100 includes a selection unit 101, a clip processing unit 102, and an inverse YCgCo-R transform unit 103.

The selection unit 101 acquires coefficient data res_x' input to the inverse adaptive color transform device 100. Furthermore, the selection unit 101 acquires cu_act_enabled_flag input to the inverse adaptive color transform device 100. cu_act_enabled_flag is flag information indicating whether or not adaptive color transform (inverse adaptive color transform) can be applied. When cu_act_enabled_flag is true (for example, "1"), it represents that the adaptive color transform (the inverse adaptive color transform) can be applied. When the cu_act_enabled_flag is false (for example, "0"), it represents that the application of the adaptive color transform (the inverse adaptive color transform) is prohibited (that is, not applicable)

The selection unit 101 selects whether or not to perform the inverse adaptive color transform on the coefficient data res_x' on the basis of the cu_act_enabled_flag. For example, when the cu_act_enabled_flag is true (for example, "1"), the selection unit 101 determines that the coefficient data res_x' is coefficient data in the YCgCo domain in which the coefficient data in the RGB domain has been subjected to the YCgCo-R transform. Then, the selection unit 101 supplies the coefficient data res_x' to the clip processing unit 102 so as to perform inverse YCgCo-R transform on the coefficient data res_x'.

For example, when cu_act_enabled_flag is false (for example, "0"), the selection unit 101 determines that the coefficient data res_x' is coefficient data in the RGB domain. Then, the selection unit 101 outputs the coefficient data res_x' to the outside of the inverse adaptive color transform device 100 as the coefficient data res_x after inverse adaptive color transform. That is, the coefficient data in the RGB domain is output to the outside of the inverse adaptive color transform device 100.

The clip processing unit 102 acquires the coefficient data res_x' supplied from the selection unit 101. Furthermore, the clip processing unit 102 acquires variables such as log 2MaxDR and BitDepth input to the inverse adaptive color transform device 100. The log 2MaxDR represents the dynamic range of the buffer that holds the coefficient data res_x' during the inverse adaptive color transform processing. The BitDepth represents the bit depth of the coefficient data res_x'.

The clip processing unit 102 performs clip processing on the coefficient data res_x' by using an upper bound and a lower bound derived on the basis of variables such as log 2MaxDR and BitDepth. The clip processing unit 102 supplies the clipped coefficient data res_x' to the inverse YCgCo-R transform unit 103.

The inverse YCgCo-R transform unit 103 acquires the coefficient data res_x' subjected to the clip processing supplied from the clip processing unit 102. The inverse YCgCo-R transform unit 103 performs the inverse YCgCo-R transform on the acquired coefficient data res_x' to generate the coefficient data res_x subjected to the inverse YCgCo-R transform. The inverse YCgCo-R transform unit 103 outputs the generated coefficient data res_x to the outside of the inverse adaptive color transform device 100. That is, the coefficient data in the RGB domain is output to the outside of the inverse adaptive color transform device 100.

<Application of Present Technology to Inverse Adaptive Color Transform Device>

In such an inverse adaptive color transform device 100, the present technology described above in <1. Clip processing of lossless inverse adaptive color transform> can be applied.

For example, the clip processing unit 102 clips the coefficient data res_x' at a level based on the bit depth of the coefficient data. Then, the inverse YCgCo-R transform unit 103 performs the inverse adaptive color transform on the coefficient data res_x' clipped at the level by the clip processing unit 102 by the lossless method.

By doing so, the clip processing unit 102 can clip the coefficient data res_x' at a level at which the distortion of the coefficient data res_x after the inverse adaptive color transform does not increase. Therefore, the inverse adaptive color transform device 100 can suppress the increase in the load of the inverse adaptive color transform processing while suppressing the increase in distortion of the coefficient data res_x after the inverse adaptive color transform.

Note that the inverse adaptive color transform device 100 can apply the various methods (including "Method 1", "Method 1-1", "Method 1-2", "Method 2", "Method 2-1", "Method 2-2", and "Method 3") of the present technology described above in <1. Clip processing of lossless inverse adaptive color transform>.

For example, as described above in <Method 1>, the clip processing unit 102 may clip the luminance component and the color component (color difference component) of the coefficient data res_x' at the same level.

Then, the inverse YCgCo-R transform unit 103 performs the inverse YCgCo-R transform on the coefficient data res_x' clipped in this way to derive the coefficient data res_x. By doing so, the clip processing unit 102 can easily perform the clip processing as compared with a case where clipping is performed at a different level for each component, and can suppress an increase in load.

For example, as described above in <Method 1-1>, the clip processing unit 102 may clip the luminance component and the color component (color difference component) of the coefficient data res_x' with, as the upper bound, a value obtained by subtracting 1 from a power of 2 with a value obtained by adding 1 to a bit depth of the coefficient data res_x' as a power index. Furthermore, the clip processing unit 102 may clip the luminance component and the color component (color difference component) of the coefficient data res_x' with, the lower bound, a value obtained by multiplying −1 by a power of 2 with a value obtained by adding 1 to the bit depth of the coefficient data res_x' as the power index. Furthermore, the clip processing unit 102 may perform both such a clip of the upper bound and clip of the lower bound.

Then, the inverse YCgCo-R transform unit 103 performs the inverse YCgCo-R transform on the coefficient data res_x' clipped in this way to derive the coefficient data res_x. By doing so, the clip processing unit 102 can make the value range between the upper bound and the lower bound of the clip processing wider than the value range theoretically possible for the coefficient data res_x'. Therefore, the inverse adaptive color transform device 100 can suppress the occurrence of the distortion of the coefficient data res_x after the inverse adaptive color transform. That is, the inverse adaptive color transform device 100 can suppress the increase in the load of the inverse adaptive color transform processing while realizing lossless transform between the coefficient data in the RGB domain and the coefficient data in the YCgCo domain.

Furthermore, for example, as described above in <Method 1-2>, the clip processing unit 102 may clip the coefficient data res_x' at a level based on the bit depth and the dynamic range of the buffer that holds the coefficient data res_x' during the inverse adaptive color transform.

Then, the inverse YCgCo-R transform unit 103 performs the inverse YCgCo-R transform on the coefficient data res_x' clipped in this way to derive the coefficient data res_x. By clipping the coefficient data res_x' in consideration of the dynamic range (hardware limitation) of the buffer in this way, the inverse adaptive color transform device 100 can suppress the occurrence of the overflow of the buffer. In other words, since the dynamic range of the buffer can be set without considering the bit depth of the coefficient data res_x' to be held, the increase in the dynamic range of the buffer can be suppressed, and the increase in the cost of the inverse adaptive color transform device 100 can be suppressed.

For example, the clip processing unit 102 may perform the clip processing at a level derived using the smaller one of the value based on the bit depth of the coefficient data res_x' and not based on the dynamic range of the buffer that holds the coefficient data res_x' and a value based on the dynamic range of the buffer and not based on the bit depth.

Then, the inverse YCgCo-R transform unit 103 performs the inverse YCgCo-R transform on the coefficient data res_x' clipped in this way to derive the coefficient data res_x. As described above, by setting the upper bound and the lower bound using the smaller value (that is, the clip processing causes the coefficient data res_x' to have a narrower value range), the inverse adaptive color transform device 100 can suppress the increase in the load of the inverse adaptive color transform processing while satisfying the hardware limitation of the buffer and suppressing the increase in the distortion of the coefficient data res_x after the inverse adaptive color transform.

For example, the clip processing unit 102 may clip the luminance component and the color component (color difference component) of the coefficient data res_x' with, as the upper bound, a value obtained by subtracting 1 from a power of 2 with the smaller one of a value obtained by adding 1 to the bit depth of the coefficient data res_x' and a value obtained by subtracting 1 from the dynamic range of the buffer that holds the coefficient data res_x' as the power index. Furthermore, the clip processing unit 102 may clip the luminance component and the color component (color difference component) of the coefficient data res_x' with, as the lower bound, a value obtained by multiplying −1 by a power of 2 with the smaller one of a value obtained by adding 1 to the bit depth of the coefficient data res_x' and a value obtained by subtracting 1 from the dynamic range of the buffer that holds the coefficient data res_x' as the power index. Furthermore, the clip processing unit 102 may perform both such a clip of the upper bound and clip of the lower bound.

Then, the inverse YCgCo-R transform unit 103 performs the inverse YCgCo-R transform on the coefficient data res_x' clipped in this way to derive the coefficient data res_x. By doing so the inverse adaptive color transform device 100 can suppress the increase in the load of the inverse adaptive color transform processing while satisfying the hardware limitation of the buffer and suppressing the increase in the distortion of the coefficient data res_x after the inverse adaptive color transform.

For example, as described above in <Method 2>, the clip processing unit 102 may clip the luminance component and the color difference component of the coefficient data res_x' at the respective levels (the first level and the second level). By doing so, the clip processing unit 102 can clip the coefficient data of each component in a value range corresponding to the component. The inverse YCgCo-R transform unit 103 performs the inverse YCgCo-R transform of the coefficient data res_x' clipped in this way, and derives the coefficient data res_x. Therefore, the inverse adaptive color transform device 100 can further suppress the increase in the load of the inverse adaptive color transform processing while suppressing the increase in the distortion of the coefficient data res_x after the inverse adaptive color transform.

For example, as described above in <Method 2-1>, the difference between the upper bound and the lower bound of the second level may be wider than the difference between the upper bound and the lower bound of the first level. The inverse YCgCo-R transform unit 103 performs the inverse YCgCo-R transform of the coefficient data res_x' clipped in this way, and derives the coefficient data res_x. By making the difference between the upper bound and the lower bound of the clip for the coefficient data res_x' of the Cg component and the Co component which are the color difference components wider than the difference between the upper bound and the lower bound of the clip for the coefficient data res_x' of the Y component which is the luminance component, the inverse adaptive color transform device 100 can further suppress the increase in the load of the inverse adaptive color transform processing while suppressing the increase in the distortion of the coefficient data res_x after the inverse adaptive color transform.

For example, the clip processing unit 102 may clip the luminance component of the coefficient data res_x' with, as the upper bound, a value obtained by subtracting 1 from a power of 2 with the bit depth of the coefficient data res_x' as the power index. Furthermore, the luminance component of the coefficient data res_x' may be clipped with, as the lower bound, a value obtained by multiplying −1 by a power of 2 with the bit depth of the coefficient data res_x' as the power index. Furthermore, the clip processing unit 102 may perform both such a clip of the upper bound and clip of the lower bound on the luminance component.

Furthermore, the clip processing unit 102 may clip the color component (color difference component) of the coefficient data res_x' with, as the upper bound, a value obtained by subtracting 1 from a power of 2 with a value obtained by adding 1 to the bit depth of the coefficient data res_x' as the power index. Furthermore, the color component (color difference component) of the coefficient data res_x' may be clipped with, as the lower bound, a value obtained by multiplying −1 by a power of 2 with a value obtained by adding 1 to the bit depth of the coefficient data res_x' as the power index. Furthermore, the clip processing unit 102 may perform both such a clip of the upper bound and clip of the lower bound on the color component (color difference component). Further, the clip processing unit 102 may perform the clip of the upper bound and the clip of the lower bound on each of the luminance component and the color component (color difference component) as described above.

The inverse YCgCo-R transform unit 103 performs the inverse YCgCo-R transform on the luminance component and the color component (color difference component) of the coefficient data res_x' clipped in this way to derive the coefficient data res_x. By doing so, the clip processing unit 102 can clip the coefficient data res_x' of each component in a value range corresponding to the component Therefore, the inverse adaptive color transform device 100 can further suppress the increase in the load of the inverse adaptive color transform processing while suppressing the increase in the distortion of the coefficient data res_x after the inverse adaptive color transform.

Furthermore, for example, the clip processing unit 102 may clip the coefficient data res_x' at a level (first level and second level) based on the bit depth and the dynamic range of the buffer that holds the coefficient data res_x' during the inverse adaptive color transform, as described above in <Method 2-2>.

The inverse YCgCo-R transform unit 103 performs the inverse YCgCo-R transform on the luminance component and the color component (color difference component) of the coefficient data res_x' clipped in this way to derive the coefficient data res_x. By doing so, the inverse adaptive color transform device 100 can suppress the occurrence of the overflow of the buffer. In other words, since the dynamic range of the buffer can be set without considering the bit depth of the coefficient data res_x' to be held, the increase in the dynamic range of the buffer can be suppressed, and the increase in the cost of the inverse adaptive color transform device 100 can be suppressed.

For example, the clip processing unit 102 may perform the clip processing on the luminance component of the coefficient data res_x' at a level derived using the smaller one of the value based on the bit depth of the coefficient data res_x' and not based on the dynamic range of the buffer that holds the coefficient data res_x' and the value based on the dynamic range of the buffer and not based on the bit depth. Furthermore, the clip processing unit 102 may perform the clip processing on the color component (color difference component) of the coefficient data res_x' at a level derived using the smaller one of the value based on a value obtained by adding 1 to the bit depth of the coefficient data res_x' and not based on the dynamic range of the buffer that holds the coefficient data res_x' and the value based on the dynamic range of the buffer and not based on the value obtained by adding 1 to the bit depth.

Then, the inverse YCgCo-R transform unit 103 performs the inverse YCgCo-R transform on the coefficient data res_x' clipped in this way to derive the coefficient data res_x. As described above, by setting the upper bound and the lower bound using the smaller value (that is, the clip processing causes the coefficient data to have a narrower value range), the inverse adaptive color transform device 100 can further suppress the increase in the load of the inverse adaptive color transform processing while satisfying the hardware limitation of the buffer and suppressing the increase in the distortion of each component of the coefficient data res_x after the inverse adaptive color transform.

For example, the clip processing unit 102 may clip the luminance component of the coefficient data res_x' with, as the upper bound, a value obtained by subtracting 1 from a power of 2 with the smaller one of the bit depth of the coefficient data res_x' and a value obtained by subtracting 1 from the dynamic range of the buffer that holds the coefficient data res_x' as the power index. Furthermore, the clip processing unit 102 may clip the luminance component of the coefficient data res_x' with, as the lower bound, a value obtained by multiplying −1 by a power of 2 with the smaller one of the bit depth of the coefficient data res_x' and a value obtained by subtracting 1 from the dynamic range of the buffer that holds the coefficient data res_x' as the power index. Furthermore, the clip processing unit 102 may perform both such a clip of the upper bound and clip of the lower bound on the luminance component.

Furthermore, the clip processing unit 102 may clip the color component (color difference component) of the coefficient data res_x' with, as the upper bound, a value obtained by subtracting 1 from a power of 2 with the smaller one of a value obtained by adding 1 to the bit depth of the coefficient data res_x' and a value obtained by subtracting 1 from the dynamic range of the buffer that holds the coefficient data res_x' as the power index. Furthermore, the clip processing unit 102 may clip the color component (color difference component) of the coefficient data res_x' with, as the lower bound, a value obtained by multiplying −1 by a power of 2 with the smaller one of a value obtained by adding 1 to the bit depth of the coefficient data res_x' and a value obtained by subtracting 1 from the dynamic range of the buffer that holds the coefficient data res_x' as the power index. Furthermore, the clip processing unit 102 may perform both such a clip of the upper bound and clip of the lower bound on the color component (color difference component). Further, the clip processing unit 102 may perform the clip of the upper bound and the clip of the lower bound on each of the luminance component and the color component (color difference component) as described above.

Then, the inverse YCgCo-R transform unit 103 performs the inverse YCgCo-R transform on the coefficient data res_x' clipped in this way to derive the coefficient data res_x. By doing so, the inverse adaptive color transform device 100 can further suppress the increase in the load of the inverse adaptive color transform processing while satisfying the hardware limitation of the buffer and suppressing the increase in the distortion of each component of the coefficient data res_x after the inverse adaptive color transform.

For example, as described above in <Method 3>, the clip processing unit 102 may clip the coefficient data res_x' at a level based on the dynamic range of the buffer that holds the coefficient data res_x' during the inverse adaptive color transform.

The inverse YCgCo-R transform unit 103 performs the inverse YCgCo-R transform on the coefficient data res_x' clipped in this way to derive the coefficient data res_x. By doing so, the inverse adaptive color transform device 100 can suppress the occurrence of the overflow of the buffer. In other words, since the dynamic range of the buffer can be set without considering the bit depth of the coefficient data to be held, the increase in the dynamic range of the buffer can be suppressed, and the increase in the cost of the inverse adaptive color transform device 100 can be suppressed.

For example, the clip processing unit 102 may clip the luminance component and the color component (color difference component) of the coefficient data res_x' with, as the upper bound, a value obtained by subtracting 1 from a power of 2 with a value obtained by subtracting 1 from the dynamic range of the buffer that holds the coefficient data res_x' at the time of the inverse adaptive color transform as the power index. Furthermore, the clip processing unit 102 may clip the luminance component and the color component (color difference component) of the coefficient data res_x' with, as the lower bound, a value obtained by multiplying −1 by a power of 2 with a value obtained by subtracting 1 from the dynamic range of the buffer as the power index.

Then, the inverse YCgCo-R transform unit 103 performs the inverse YCgCo-R transform on the coefficient data res_x' clipped in this way to derive the coefficient data res_x. By doing so, the inverse adaptive color transform device 100 can satisfy the hardware limitation of the buffer, and can suppress the occurrence of the overflow of the buffer. Furthermore, the increase in cost of the inverse adaptive color transform device 100 can be suppressed. Furthermore, since the value range of the coefficient data is limited by the clip processing, the inverse adaptive color transform device 100 can suppress the increase in the load of the inverse adaptive color transform processing. Furthermore, in a case where the value range of the coefficient data is narrower than the dynamic range of the buffer, by doing so, the inverse adaptive color transform device 100 can suppress the increase in the distortion of the coefficient data after the inverse adaptive color transform.

Note that the inverse adaptive color transform device 100 can apply the various application examples described above in <Application Examples>.

<Flow of Inverse Adaptive Color Transform Processing>

Figure 3:
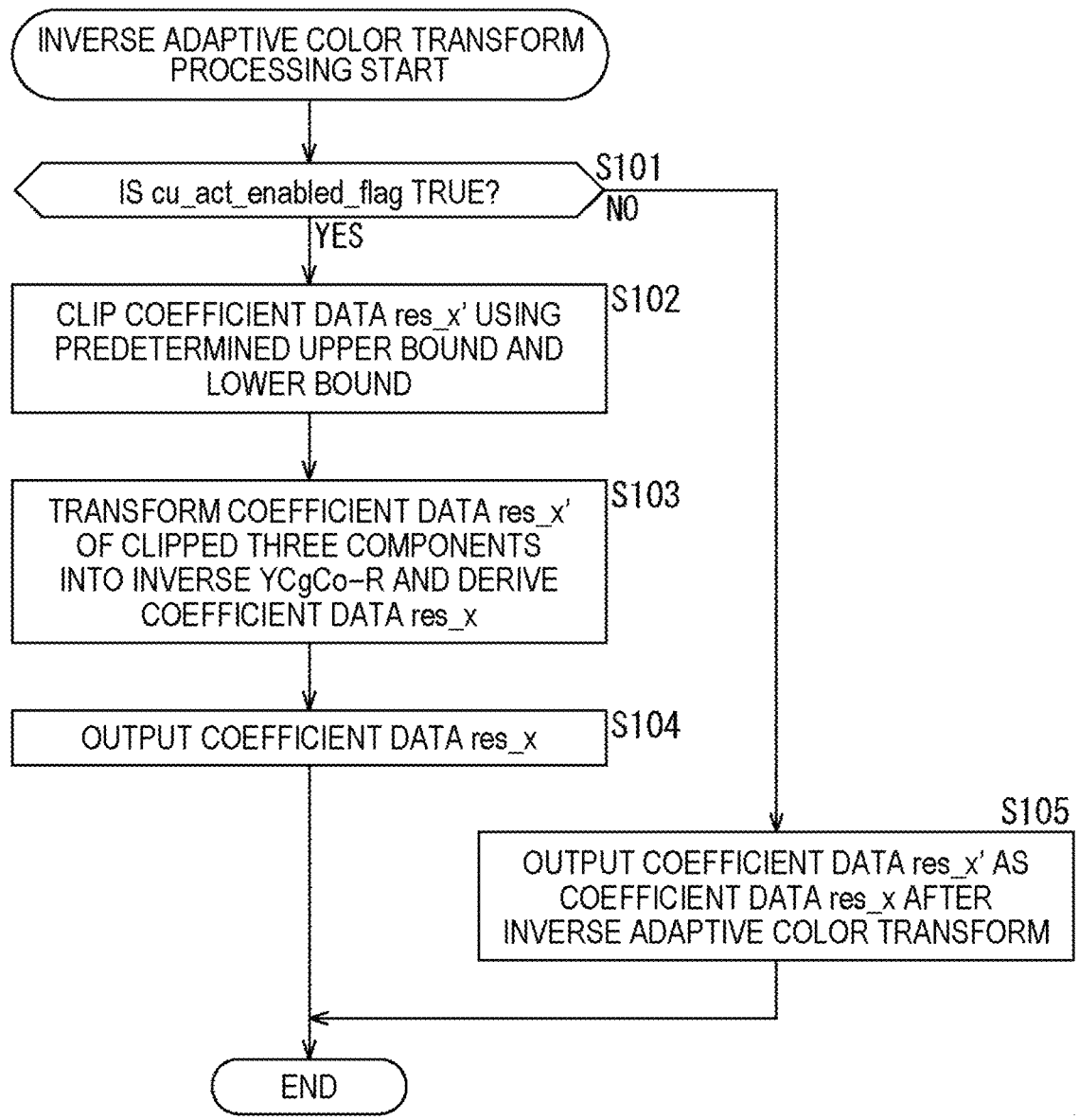
FIG. 3 is a flowchart illustrating an example of a flow of inverse adaptive color transform processing.

Next, an example of a flow of the inverse adaptive color transform processing performed by the inverse adaptive color transform device 100 will be described with reference to a flowchart of FIG. 3.

When the inverse adaptive color transform processing is started, the selection unit 101 of the inverse adaptive color transform device 100 determines in step S101 whether or not cu_act_enabled_flag is true. In a case where cu_act_enabled_flag is determined to be true, the process proceeds to step S102.

In step S102, the clip processing unit 102 clips the coefficient data res_x' using a predetermined upper bound and a predetermined lower bound.

In step S103, the inverse YCgCo-R transform unit 103 performs the inverse YCgCo-R transform on the coefficient data res_x' clipped in step S102 to derive the coefficient data res_x after the inverse adaptive color transform.

In step S104, the inverse YCgCo-R transform unit 103 outputs the derived coefficient data res_x to the outside of the inverse adaptive color transform device 100. When the process of step S104 ends, the inverse adaptive color transform processing ends.

Furthermore, in a case where the cu_act_enabled_flag is determined to be false in step S101, the process proceeds to step S105.

In step S105, the selection unit 101 outputs the coefficient data res_x' to the outside of the inverse adaptive color transform device 100 as the coefficient data res_x after the inverse adaptive color transform. When the process of step S105 ends, the inverse adaptive color transform processing ends.

<Application of Present Technology to Inverse Adaptive Color Transform Processing>

In such inverse adaptive color transform processing, the present technology described above in <1. Clip processing of lossless inverse adaptive color transform> can be applied.

For example, in step S102, the clip processing unit 102 clips the coefficient data res_x' at a level based on the bit depth of the coefficient data. Then, in step S103, the inverse YCgCo-R transform unit 103 performs the inverse adaptive color transform on the coefficient data res_x' clipped at the level by the clip processing unit 102 by the lossless method.

By doing so, the clip processing unit 102 can clip the coefficient data res_x' at a level at which the distortion of the coefficient data res_x after the inverse adaptive color transform does not increase. Therefore, the inverse adaptive color transform device 100 can suppress the increase in the load of the inverse adaptive color transform processing while suppressing the increase in distortion of the coefficient data res_x after the inverse adaptive color transform.

Note that, in such inverse adaptive color transform processing, various methods (including "Method 1", "Method 1-1", "Method 1-2", "Method 2", "Method 2-1", "Method 2-2", and "Method 3") of the present technology described above in <1. Clip processing of lossless inverse adaptive color transform> can be applied. By applying any one of these methods, an effect similar to that described in <Application of present technology to inverse adaptive color transform device> can be obtained.

3. Second Embodiment

<Inverse Quantization Inverse Transform Device>

Figure 4:
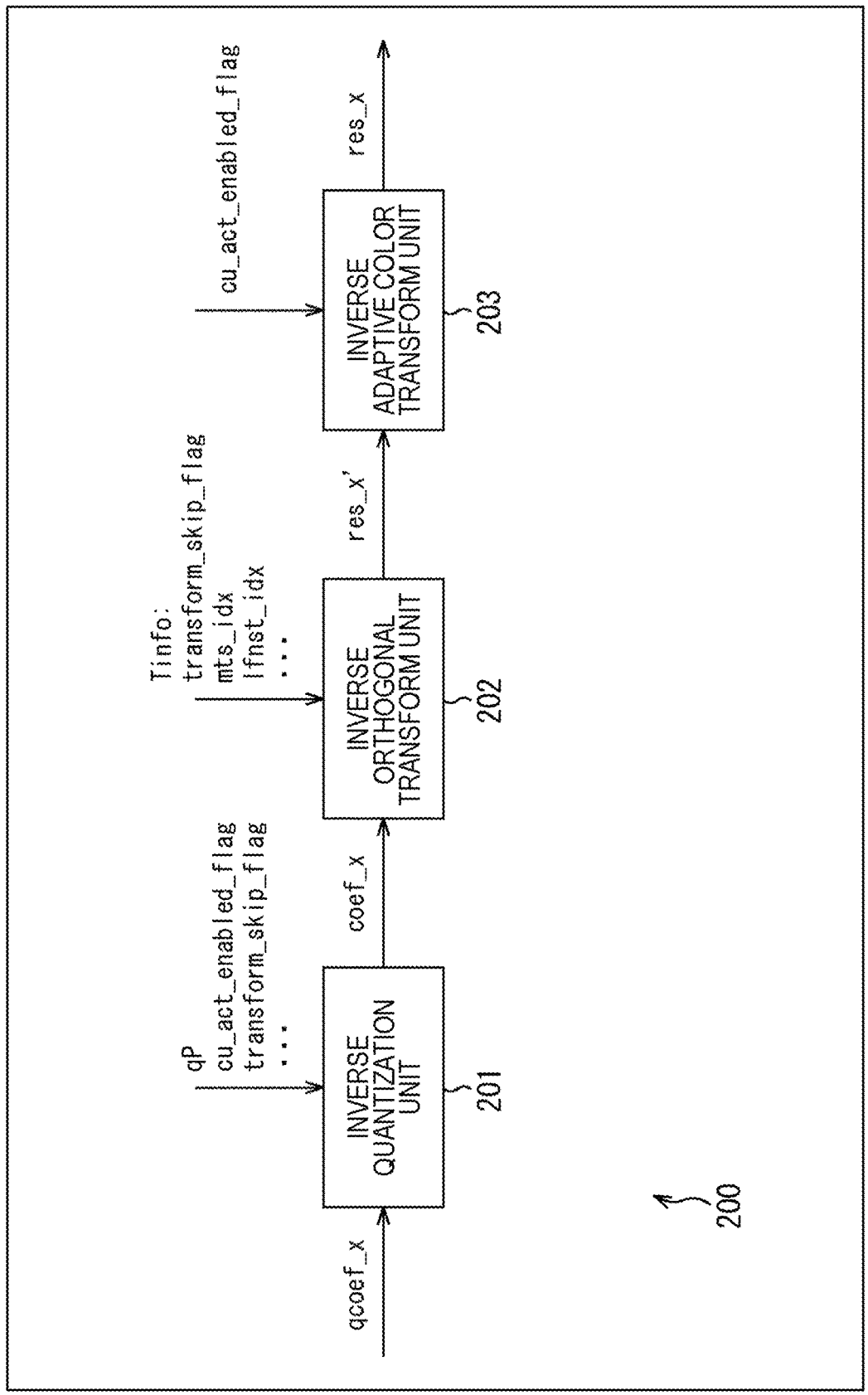
FIG. 4 is a block diagram illustrating a main configuration example of an inverse quantization inverse transform device.

The inverse adaptive color transform device 100 (inverse adaptive color transform processing) described above can be applied to an inverse quantization inverse transform device that performs inverse quantization inverse transform processing FIG. 4 is a block diagram illustrating an example of a configuration of an inverse quantization inverse transform device which is an aspect of an image processing apparatus to which the present technology is applied. An inverse quantization inverse transform device 200 illustrated in FIG. 4 is a device that performs adaptive color transform (YCgCo-R transform) on coefficient data in an RGB domain related to an image by a lossless method, performs orthogonal transform, inversely quantizes a quantization coefficient quantized by a method corresponding to the quantization, performs inverse orthogonal transform by a method corresponding to the orthogonal transform, and performs the inverse adaptive color transform (inverse YCgCo-R transform) by the lossless method. Such processing (processing performed by the inverse quantization inverse transform device 200) is also referred to as the inverse quantization inverse transform processing.

Note that, in FIG. 4, main processing units, data flows, and the like are illustrated, and those illustrated in FIG. 4 are not necessarily all. That is, in the inverse quantization inverse transform device 200, there may be a processing unit not illustrated as a block in FIG. 4, or there may be processing or a data flow not illustrated as an arrow or the like in FIG. 4.

As illustrated in FIG. 4, the inverse quantization inverse transform device 200 includes an inverse quantization unit 201, an inverse orthogonal transform unit 202, and an inverse adaptive color transform unit 203.

The inverse quantization unit 201 acquires a quantization coefficient qcoef_x. The quantization coefficient qcoef_x is derived by quantizing the orthogonal transform coefficient coef_x by a predetermined method. Furthermore, the inverse quantization unit 201 acquires parameters necessary for inverse quantization, such as quantization parameters qP, cu_act_enabled_flag, and transform_skip_flag. transform_skip_flag is flag information indicating whether or not to skip (omit) the inverse orthogonal transform processing. For example, when the transform_skip_flag is true, the inverse orthogonal transform processing is skipped. Furthermore, in a case where the transform_skip_flag is false, the inverse orthogonal transform processing is performed.

Using these parameters, the inverse quantization unit 201 inversely quantizes the quantization coefficient qcoef_x by a predetermined method corresponding to the above-described quantization to derive the orthogonal transform coefficient coef_x. The inverse quantization unit 201 supplies the derived orthogonal transform coefficient coef_x to the inverse orthogonal transform unit 202.

The inverse orthogonal transform unit 202 acquires the orthogonal transform coefficient coef_x supplied from the inverse quantization unit 201. The orthogonal transform coefficient coef_x is derived by orthogonally transforming the coefficient data res_x' by a predetermined method. Furthermore, the inverse orthogonal transform unit 202 acquires parameters necessary for inverse quantization, such as transform information Tinfo, transform_skip_flag, mts_idx, and lfnst_idx. The mts_idx is an identifier of multiple transform selection (MTS). The lfnst_idx is mode information related to a low-frequency secondary transform. Using these parameters, the inverse orthogonal transform unit 202 inversely orthogonally transforms the orthogonal transform coefficient coef_x by a predetermined method corresponding to the above-described orthogonal transform, and derives coefficient data res_x' subjected to the adaptive color transform by the lossless method. The inverse orthogonal transform unit 202 supplies the derived coefficient data res_x' to the inverse adaptive color transform unit 203.

The inverse adaptive color transform unit 203 acquires the coefficient data res_x' supplied from the inverse orthogonal transform unit 202. The coefficient data res_x' is as described in the first embodiment. Furthermore, the inverse adaptive color transform unit 203 acquires the cu_act_enabled_flag. The inverse adaptive color transform unit 203 appropriately performs the inverse adaptive color transform (inverse YCgCo-R transform) on the coefficient data res_x' by the lossless method on the basis of the cu_act_enabled_flag to derive the coefficient data res_x after the inverse adaptive color transform processing. The coefficient data res_x is as described in the first embodiment and is coefficient data in the RGB domain.

The inverse adaptive color transform unit 203 outputs the derived coefficient data res_x to the outside of the inverse quantization inverse transform device 200.

<Application of Present Technology to Inverse Quantization Inverse Transform Device>

In such an inverse quantization inverse transform device 200, the present technology described above in <1. Clip processing of lossless inverse adaptive color transform> can be applied. That is, the inverse quantization inverse transform device 200 can apply the inverse adaptive color transform device 100 described in the first embodiment as the inverse adaptive color transform unit 203. In that case, the inverse adaptive color transform unit 203 has a configuration similar to that of the inverse adaptive color transform device 100, and performs similar processing.

For example, in the inverse adaptive color transform unit 203, the clip processing unit 102 clips the coefficient data res_x' supplied from the inverse orthogonal transform unit 202 at a level based on the bit depth of the coefficient data. Then, the inverse YCgCo-R transform unit 103 performs the inverse YCgCo-R transform on the coefficient data res_x' clipped at the level by the clip processing unit 102 to derive coefficient data res_x after the inverse adaptive color transform processing. Then, the inverse YCgCo-R transform unit 103 outputs the derived coefficient data res_x to the outside of the inverse quantization inverse transform device 200.

By doing so, the inverse adaptive color transform unit 203 can perform the clip on the coefficient data res_x' at a level at which the distortion of the coefficient data res_x after the inverse adaptive color transform does not increase. Therefore, as in the case of the inverse adaptive color transform device 100, the inverse adaptive color transform unit 203 can suppress the increase in the load of the inverse adaptive color transform processing while suppressing the increase in the distortion of the coefficient data res_x after the inverse adaptive color transform. Therefore, the inverse quantization inverse transform device 200 can suppress the increase in the load of the inverse quantization inverse transform processing while suppressing the increase in the distortion of the coefficient data res_x to be output.

Then, as in the case of the inverse adaptive color transform device 100, the inverse adaptive color transform unit 203 can apply the various methods (including "Method 1", "Method 1-1", "Method 1-2", "Method 2", "Method 2-1", "Method 2-2", and "Method 3") of the present technology described above in <1. Clip processing of lossless inverse adaptive color transform>. That is, the inverse quantization inverse transform device 200 can apply various methods of the present technology described above in <1. Clip processing of lossless inverse adaptive color transform>. By applying any one of these methods, the inverse quantization inverse transform device 200 can obtain effects similar to those described in <Application of the present technology to the inverse adaptive color transform device>.

<Flow of Inverse Quantization Inverse Transform Processing>

Figure 5:
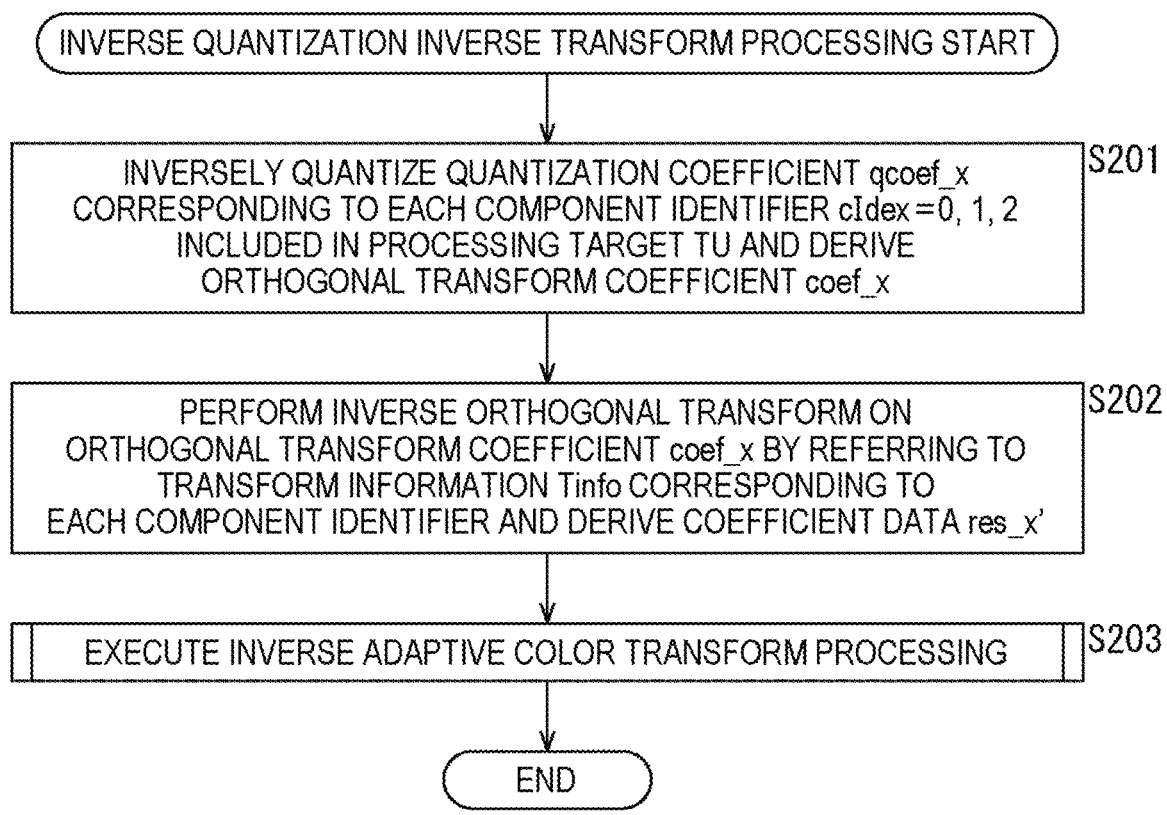
FIG. 5 is a flowchart illustrating an example of a flow of inverse quantization inverse transform processing.

Next, an example of a flow of the inverse quantization inverse transform processing performed by the inverse quantization inverse transform device 200 will be described with reference to a flowchart of FIG. 5.

When the inverse quantization inverse transform processing is started, in step S201, the inverse quantization unit 201 of the inverse quantization inverse transform device 200 inversely quantizes the quantization coefficient qcoef_x corresponding to each component identifier cIdx=0, 1, and 2 included in the processing target TU to derive the orthogonal transform coefficient coef_x.

In step S202, the inverse orthogonal transform unit 202 refers to the transform information Tinfo corresponding to each component identifier, and inversely orthogonally transforms the orthogonal transform coefficient coef_x to derive coefficient data res_x'.

In step S203, the inverse adaptive color transform unit 203 performs the inverse adaptive color transform processing, performs inverse YCgCo-R transform on the coefficient data res_x', and derives coefficient data res_x after the inverse adaptive color transform processing.

When the process of step S203 ends, the inverse quantization inverse transform processing ends.

<Application of Present Technology to Inverse Quantization Inverse Transform Processing>

In such inverse quantization inverse transform processing, the present technology described above in <1.

Clip processing of lossless inverse adaptive color transform> can be applied. That is, the inverse adaptive color transform processing described with reference to the flowchart of FIG. 3 can be applied as the inverse adaptive color transform processing of step S203.

By doing so, the inverse adaptive color transform unit 203 can perform the clip on the coefficient data res_x' at a level at which the distortion of the coefficient data res_x after the inverse adaptive color transform does not increase. Therefore, the inverse adaptive color transform unit 203 can suppress the increase in the load of the inverse adaptive color transform processing while suppressing the increase in distortion of the coefficient data res_x after the inverse adaptive color transform.

That is, by performing the inverse quantization inverse transform processing as described above, the inverse quantization inverse transform device 200 can suppress the increase in the load of the inverse quantization inverse transform processing while suppressing the increase in distortion of the coefficient data res_x to be output.

Note that, in the inverse quantization inverse transform processing (of the inverse adaptive color transform processing (step S203)), the various methods (including "Method 1", "Method 1-1", "Method 1-2", "Method 2", "Method 2-1", "Method 2-2", and "Method 3") of the present technology described above in <1. Clip processing of lossless inverse adaptive color transform> can be applied. By applying any one of these methods, it is possible to obtain an effect (that is, effects similar to those described in <Application of the present technology to the inverse adaptive color transform device>) similar to that described in <Application of the present technology to inverse quantization inverse transform device>.

4. Third Embodiment

<Image Decoding Device>

Figure 6:
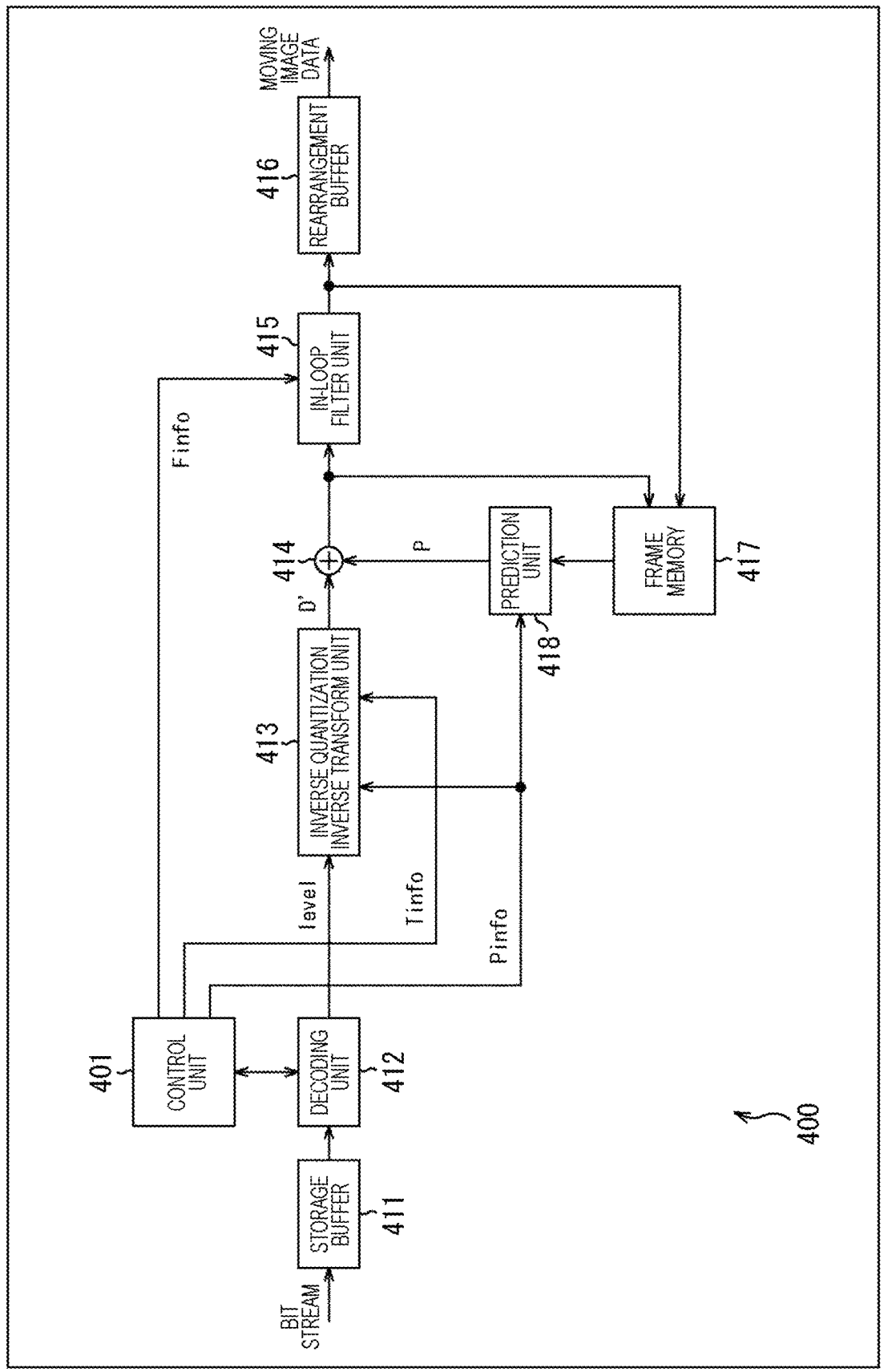
FIG. 6 is a block diagram illustrating a main configuration example of an image decoding device.

The inverse quantization inverse transform device 200 (inverse quantization inverse transform processing) described above can be applied to an image decoding device. FIG. 6 is a block diagram illustrating an example of a configuration of an image decoding device which is an aspect of an image processing apparatus to which the present technology is applied. An image decoding device 400 illustrated in FIG. 6 is a device that decodes coded data of a moving image. For example, the image decoding device 400 decodes coded data of a moving image encoded by a coding method such as VVC, AVC, or HEVC described in the above-described Non-Patent Document. For example, the image decoding device 400 can decode coded data (bit stream) generated by an image coding device 500 (FIG. 8) to be described later.

Note that, in FIG. 6, main processing units, data flows, and the like are illustrated, and those illustrated in FIG. 6 are not necessarily all. That is, in the image decoding device 400, there may be a processing unit not illustrated as a block in FIG. 6, or there may be processing or a data flow not illustrated as an arrow or the like in FIG. 6. The same applies to other drawings describing a processing unit and the like in the image decoding device 400.

As illustrated in FIG. 6, the image decoding device 400 includes a control unit 401, a storage buffer 411, a decoding unit 412, an inverse quantization inverse transform unit 413, a calculation unit 414, an in-loop filter unit 415, a rearrangement buffer 416, a frame memory 417, and a prediction unit 418. Note that the prediction unit 418 includes an intra prediction unit and an inter prediction unit (not illustrated).

<Control Unit>

The control unit 401 performs processing related to decoding control. For example, the control unit 401 acquires the coding parameters (header information Hinfo, prediction mode information Pinfo, transform information Tinfo, residual information Rinfo, filter information Finfo, and the like) included in the bit stream via the decoding unit 412. Furthermore, the control unit 401 can estimate coding parameters not included in the bit stream. Furthermore, the control unit 401 controls each processing unit (the storage buffer 411 to the prediction unit 418) of the image decoding device 400 on the basis of the acquired (or estimated) coding parameter to control decoding.

For example, the control unit 401 supplies the header information Hinfo to the inverse quantization inverse transform unit 413, the prediction unit 418, and the in-loop filter unit 415. Furthermore, the control unit 401 supplies the prediction mode information Pinfo to the inverse quantization inverse transform unit 413 and the prediction unit 418. Furthermore, the control unit 401 supplies the transform information Tinfo to the inverse quantization inverse transform unit 413. Furthermore, the control unit 401 supplies the residual information Rinfo to the decoding unit 412. Furthermore, the control unit 401 supplies the filter information Finfo to the in-loop filter unit 415.

Of course, the above example is an example, and the present invention is not limited to this example. For example, each coding parameter may be supplied to an arbitrary processing unit. Furthermore, other information may be supplied to an arbitrary processing unit.

<Header information Hinfo>

The header information Hinfo may include, for example, information such as a video parameter set (VPS), a sequence parameter set (SPS), a picture parameter set (PPS), a picture header (PH), and a slice header (SH).

For example, the header information Hinfo may include information (for example, parameters such as PicWidth indicating the horizontal width of the image and PicHeight indicating the vertical width of the image) that defines an image size. Furthermore, the header information Hinfo may include information (for example, parameters such as bitDepthY indicating the bit depth of the luminance component and bitDepthC indicating the bit depth of the color difference component) that defines a bit depth. Further, the header information Hinfo may include ChromaArrayType which is a parameter indicating a chrominance array type. Furthermore, the header information Hinfo may include parameters such as MaxCUSize indicating the maximum value of the CU size and MinCUSize indicating the minimum value of the CU size. Furthermore, the header information Hinfo may include parameters such as MaxQTDepth indicating the maximum depth and MinQTDepth indicating the minimum depth of quad-tree division (also referred to as quad-tree division). Furthermore, the header information Hinfo may include parameters such as MaxBTDepth indicating the maximum depth and MinBTDepth indicating the minimum depth of binary-tree division. Furthermore, the header information Hinfo may include a parameter such as MaxTSSize indicating the maximum value of the transform skip block (also referred to as the maximum transform skip block size).

Furthermore, the header information Hinfo may include information that defines an on/off flag (also referred to as a valid flag) and the like of each coding tool. For example, the header information Hinfo may include an on/off flag related to orthogonal transform processing or quantization processing. Note that the on/off flag of a coding tool can also be interpreted as a flag indicating whether or not syntax related to the coding tool exists in the coded data. Furthermore, in a case where the value of the on/off flag is 1 (true), it may indicate that the coding tool is usable, and in a case where the value of the on/off flag is 0 (false), it may indicate that the coding tool is unusable The interpretation (true or false) of the flag value may be inversed.

<Prediction Mode Information Pinfo>

The prediction mode information Pinfo may include, for example, a parameter such as PBSize indicating the size (predicted block size) of the processing target predicted block (PB), and information such as intra prediction mode information IPinfo and motion prediction information MVinfo.

The intra prediction mode information IPinfo may include, for example, information such as prev_intra_luma_pred_flag, mpm_idx, and rem_intra_pred_mode in JCTVC-W 1005, 7.3.8.5 Coding Unit syntax, and IntraPredModeY indicating a luminance intra prediction mode derived from the syntax.

Furthermore, the intra prediction mode information IPinfo may include, for example, information such as ccp_flag (cclmp_flag), mclm_flag, chroma_sample_loc_type_idx, chroma_mpm_idx, and IntraPredModeC indicating a luminance intra prediction mode derived from these syntaxes.

ccp_flag (cclmp_flag) is an inter-component prediction flag and is flag information indicating whether or not to apply inter-component linear prediction. For example, when ccp_flag==1, it represents that the inter-component prediction is applied, and when ccp_flag==0, it represents that the inter-component prediction is not applied.

mclm_flag is a multi-class linear prediction mode flag and is information (linear prediction mode information) regarding a mode of linear prediction. More specifically, mclm_flag is flag information indicating whether or not to set the multi-class linear prediction mode. For example, when mclm_flag==0, it represents a one-class mode (single-class mode) (for example, CCLMP), and when mclm_flag==1, it represents a two-class mode (multi-class mode) (for example, MCLMP).

chroma_sample_loc_type_idx is a chrominance sample position type identifier and is an identifier for identifying a type (also referred to as a chrominance sample position type) of a pixel position of the color difference component. Note that this chrominance sample position type identifier (chroma_sample_loc_type_idx) is transmitted as chroma_sample_loc_info_0 (that is, it is stored in chroma_sample_loc_info ( ). This chroma_sample_loc_info_0 is information regarding the pixel position of the color difference component.

chroma_mpm_idx is a chrominance MPM identifier and is an identifier indicating which prediction mode candidate in the chrominance intra prediction mode candidate list (intraPredModeCandListC) is designated as the chrominance intra prediction mode.

The motion prediction information MVinfo may include, for example, information such as merge_idx, merge_flag, inter_pred_idc, ref_idx_LX, mvp_lX_flag, X={0, 1}, and mvd (see, e.g., JCTVC-W 1005, 7.3.8.6 Prediction Unit Syntax).

Of course, the information included in the prediction mode information Pinfo is arbitrary, and information other than these pieces of information may be included in the prediction mode information Pinfo.

<Transform Information Tinfo>

The transform information Tinfo may include, for example, information such as TBWSize, TBHSize, is flag, scanIdx, a quantization parameter qP, and a quantization matrix scaling matrix (see, e.g., JCTVC-W 1005, 7.3.4 Scaling list data syntax).

The TBWSize is a parameter indicating the horizontal width size of the transform block to be processed. Note that the transform information Tinfo may include a logarithmic value log 2TBWSize of TBWSize having a base of 2 instead of TBWSize. TBHSize is a parameter indicating the vertical width size of the transform block to be processed. Note that the transform information Tinfo may include a logarithmic value log 2TBHSize of TBHSize having a base of 2 instead of TBHSize.

The is flag is a transform_skip_flag and is flag information indicating whether or not to skip (inverse) primary transform and (inverse) secondary transform. The scanIdx is a scan identifier.

Of course, the information included in the transform information Tinfo is arbitrary, and information other than these pieces of information may be included in the transform information Tinfo.

<Residual Information Rinfo>

The residual information Rinfo (see, for example, 7.3.8.11 Residual Coding syntax of JCTVC-W 1005) may include, for example, the following information.

cbf (coded_block_flag): residual data presence/absence flag last_sig_coeff_x_pos: last non-zero coefficient X coordinate last_sig_coeff_y_pos: last non-zero coefficient Y-coordinate coded_sub_block_flag: subblock non-zero coefficient presence/absence flag sig_coeff_flag: non-zero coefficient presence/absence flag gr1_flag: a flag indicating whether or not the level of the non-zero coefficient is greater than 1 (also referred to as GR1 flag) gr2 flag: a flag indicating whether or not the level of the non-zero coefficient is greater than 2 (also referred to as GR2 flag) sign flag: a sign indicating positive or negative of the non-zero coefficient (also referred to as sign code)

coeff abs level remaining: residual level of non-zero coefficient (also referred to as non-zero coefficient residual level)

Of course, the information included in the residual information Rinfo is arbitrary, and information other than these pieces of information may be included.

<Filter Information Finfo>

The filter information Finfo may include, for example, control information related to each filter processing described below.

Control information regarding a deblocking filter (DBF)

Control information regarding pixel adaptive offset (SAO)

Control Information regarding an adaptive loop filter (ALF)

Control information regarding other linear/nonlinear filters

Furthermore, for example, a picture to which each filter is applied, information specifying a region in the picture, ON/OFF control information of a filter in units of CUs, ON/OFF control information of a filter related to a boundary between slices and tiles, and the like may be included. Of course, the information included in the filter information Finfo is arbitrary, and information other than these pieces of information may be included.

<Storage Buffer>

The storage buffer 411 acquires and holds (stores) the bit stream input to the image decoding device 400. The storage buffer 411 extracts coded data included in the accumulated bit stream at a predetermined timing or when a predetermined condition is satisfied, and supplies the coded data to the decoding unit 412.

<Decoding Unit>

The decoding unit 412 acquires the coded data supplied from the storage buffer 411, performs entropy decoding (lossless decoding) on the syntax value of each syntax element from the bit string according to the definition of the syntax table, and derives a coding parameter.

The coding parameter may include, for example, information such as header information Hinfo, prediction mode information Pinfo, transform information Tinfo, residual information Rinfo, and filter information Finfo. That is, the decoding unit 412 decodes and parses (analyzes and acquires) these pieces of information from the bit stream.

The decoding unit 412 performs such processing (decoding, parsing, or the like) under the control of the control unit 401, and supplies the obtained information to the control unit 401.

Further, the decoding unit 412 decodes the coded data with reference to the residual information Rinfo. At that time, the decoding unit 412 applies entropy decoding (lossless decoding) such as CABAC or CAVLC, for example. That is, the decoding unit 412 decodes the coded data by a decoding method corresponding to the coding method of the coding processing performed by the coding unit 514 of the image coding device 500.

For example, it is assumed that CABAC is applied. The decoding unit 412 performs arithmetic decoding using the context model on the coded data and derives a quantization coefficient level at each coefficient position in each transform block. The decoding unit 412 supplies the derived quantization coefficient level to the inverse quantization inverse transform unit 413.

<Inverse Quantization Inverse Transform Unit>

The inverse quantization inverse transform unit 413 acquires the quantization coefficient level supplied from the decoding unit 412. The inverse quantization inverse transform unit 413 acquires the coding parameters such as the prediction mode information Pinfo and the transform information Tinfo supplied from the control unit 401.

The inverse quantization inverse transform unit 413 performs an inverse quantization inverse transform processing for the quantization coefficient level on the basis of the coding parameters such as the prediction mode information Pinfo and the transform information Tinfo to derive residual data D'. The inverse quantization inverse transform processing is an inverse processing of the transform quantization processing performed in the transform quantization unit 513 (FIG. 8) to be described later. That is, in the inverse quantization inverse transform processing, for example, processes such as inverse quantization, inverse orthogonal transform, and the inverse adaptive color transform are performed. The inverse quantization is inverse processing of the quantization performed in the transform quantization unit 513. The inverse orthogonal transform is inverse processing of the orthogonal transform performed in the transform quantization unit 513. The inverse adaptive color transform is inverse processing of the adaptive color transform performed in the transform quantization unit 513. Of course, the processing included in the inverse quantization inverse transform processing is arbitrary, and some of the above-described processing may be omitted, or processing other than the above-described processing may be included. The inverse quantization inverse transform unit 413 supplies the derived residual data D' to the calculation unit 414.

<Calculation Unit>

The calculation unit 414 acquires the residual data D' supplied from the inverse quantization inverse transform unit 413 and the predicted image supplied from the prediction unit 418. The calculation unit 414 adds the residual data D' and the predicted image P corresponding to the residual data D' to derive a locally decoded image. The calculation unit 414 supplies the derived locally decoded image to the in-loop filter unit 415 and the frame memory 417.

<In-Loop Filter Unit>

The in-loop filter unit 415 acquires the locally decoded image supplied from the calculation unit 414. The in-loop filter unit 415 acquires the filter information Finfo supplied from the control unit 401. Note that the information input to the in-loop filter unit 415 is arbitrary, and information other than these pieces of information may be input.

The in-loop filter unit 415 appropriately performs a filter processing on the locally decoded image on the basis of the filter information Finfo. For example, the in-loop filter unit 415 can apply a bilateral filter as the filter processing. For example, the in-loop filter unit 415 can apply the deblocking filter (DBF) as the filter processing. For example, the in-loop filter unit 415 can apply an adaptive offset filter (sample adaptive offset (SAO)) as the filter processing. For example, the in-loop filter unit 415 can apply the adaptive loop filter (ALF) as the filter processing. In addition, the in-loop filter unit 415 can apply a plurality of filters in combination as the filter processing. Note that which filter is applied and in which order the filter is applied are arbitrary and can be selected as appropriate. For example, the in-loop filter unit 415 applies four in-loop filters of a bilateral filter, a deblocking filter, an adaptive offset filter, and an adaptive loop filter in this order as the filter processing.

The in-loop filter unit 415 performs the filter processing corresponding to the filter processing performed by the coding side device. For example, the in-loop filter unit 415 performs the filter processing corresponding to the filter processing performed by an in-loop filter unit 518 (FIG. 8) of the image coding device 500 described later. Of course, the filter processing performed by the in-loop filter unit 415 is arbitrary and is not limited to the above example. For example, the in-loop filter unit 415 may apply a Wiener filter or the like.

The in-loop filter unit 415 supplies the locally decoded image subjected to the filter processing to the rearrangement buffer 416 and the frame memory 417.

<Rearrangement Buffer>

The rearrangement buffer 416 receives the locally decoded image supplied from the in-loop filter unit 415 as an input, and holds (stores) the locally decoded image. The rearrangement buffer 416 reconstructs the decoded image for each picture unit using the locally decoded image, and holds (stores in the buffer) the decoded image. The rearrangement buffer 416 rearranges the obtained decoded images in reproduction order from decoding order. The rearrangement buffer 416 outputs the decoded image group rearranged in the reproduction order to the outside of the image decoding device 400 as moving image data.

<Frame Memory>

The frame memory 417 acquires the locally decoded image supplied from the calculation unit 414, reconstructs the decoded image for each picture unit, and stores the decoded image in a buffer in the frame memory 417. Furthermore, the frame memory 417 acquires the locally decoded image subjected to the in-loop filter processing supplied from the in-loop filter unit 415, reconstructs the decoded image for each picture unit, and stores the decoded image in the buffer in the frame memory 417.

The frame memory 417 appropriately supplies the stored decoded image (or a part thereof) to the prediction unit 418 as a reference image. Note that the frame memory 417 may store header information Hinfo, prediction mode information Pinfo, transform information Tinfo, filter information Finfo, and the like related to generation of the decoded image.

<Prediction Unit>

The prediction unit 418 acquires the prediction mode information Pinfo supplied from the control unit 401. Furthermore, the prediction unit 418 acquires the decoded image (or a part thereof) read from the frame memory 417. The prediction unit 418 performs prediction processing in the prediction mode adopted at the time of coding on the basis of the prediction mode information Pinfo, and generates the predicted image P by referring to the decoded image as a reference image. The prediction unit 418 supplies the generated predicted image P to the calculation unit 414.

<Application of Present Technology to Image Decoding Device>

In such an image decoding device 400, the present technology described above in <1. Clip processing of lossless inverse adaptive color transform> can be applied. That is, the image decoding device 400 can apply the inverse quantization inverse transform device 200 described in the second embodiment as the inverse quantization inverse transform unit 413. In that case, the inverse quantization inverse transform unit 413 has a configuration similar to that of the inverse quantization inverse transform device 200 (FIG. 4) and performs similar processing.

For example, in the inverse quantization inverse transform unit 413, the inverse quantization unit 201 acquires the quantization coefficient level supplied from the decoding unit 412 as the quantization coefficient qcoef_x. Then, the inverse quantization unit 201 inversely quantizes the quantization coefficient qcoef_x by using information such as the quantization parameter qP, cu_act_enabled_flag, and transform_skip_flag to derive the orthogonal transform coefficient coef_x.

The inverse orthogonal transform unit 202 inversely orthogonally transforms the orthogonal transform coefficient coef_x derived by the inverse quantization unit 201 using information such as the transform information Tinfo, transform_skip_flag, mts_idx, and lfnst_idx, and derives coefficient data res_x'.

The inverse adaptive color transform unit 203 appropriately performs the inverse adaptive color transform (inverse YCgCo-R transform) on the coefficient data res_x' derived by the inverse orthogonal transform unit 202 by the lossless method on the basis of cu_act_enabled_flag to derive the coefficient data res_x after the inverse adaptive color transform processing. The inverse adaptive color transform unit 203 supplies the derived coefficient data res_x to the calculation unit 414 as residual data D'.

As described in the first embodiment, the inverse adaptive color transform unit 203 has a configuration similar to that of the inverse adaptive color transform device 100, and performs similar processing. For example, in the inverse adaptive color transform unit 203, the clip processing unit 102 clips the coefficient data res_x' supplied from the inverse orthogonal transform unit 202 at a level based on the bit depth of the coefficient data. Then, the inverse YCgCo-R transform unit 103 performs the inverse YCgCo-R transform on the coefficient data res_x' clipped at the level by the clip processing unit 102 to derive coefficient data res_x after the inverse adaptive color transform processing. Then, the inverse YCgCo-R transform unit 103 supplies the derived coefficient data res_x to the calculation unit 414 as residual data D'.

By doing so, the inverse quantization inverse transform unit 413 can perform the clip on the coefficient data res_x' at a level at which the distortion of the coefficient data res_x after the inverse adaptive color transform does not increase. Therefore, similarly to the case of the inverse quantization inverse transform device 200, the inverse quantization inverse transform unit 413 can suppress the increase in the load of the inverse quantization inverse transform processing while suppressing the increase in the distortion of the coefficient data res_x (residual data D') to be output. That is, the image decoding device 400 can suppress the increase in the load of the image decoding processing while suppressing the reduction in the quality of the decoded image.

Then, as in the case of the inverse quantization inverse transform device 200, the inverse quantization inverse transform unit 413 can apply the various methods (including "Method 1", "Method 1-1", "Method 1-2", "Method 2", "Method 2-1", "Method 2-2", and "Method 3") of the present technology described above in <1. Clip processing of lossless inverse adaptive color transform>. That is, the image decoding device 400 can apply the various methods of the present technology described above in <1. Clip processing of lossless inverse adaptive color transform>. By applying any one of these methods, the image decoding device 400 can obtain an effect (that is, effects similar to those described in <Application of the present technology to the inverse adaptive color transform device>) similar to that described in <Application of the present technology to inverse quantization inverse transform device>.

<Flow of Image Decoding Processing>

Figure 7:
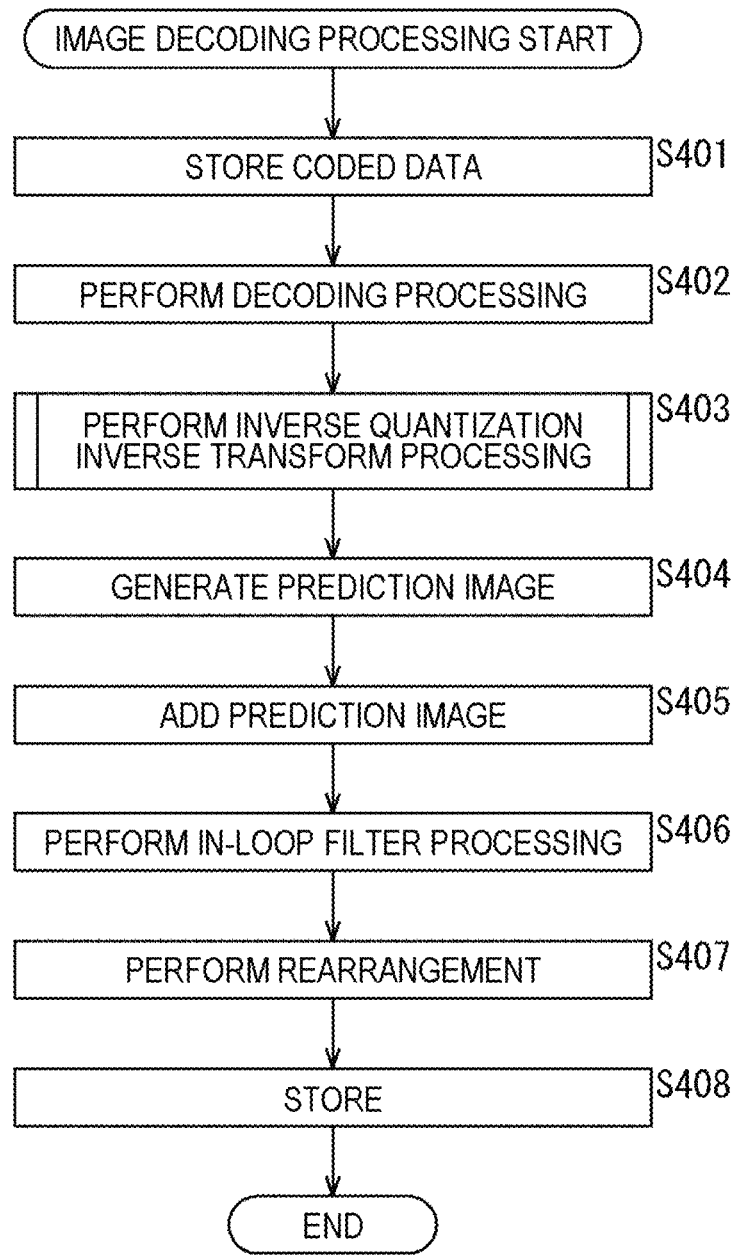
FIG. 7 is a flowchart illustrating an example of a flow of image decoding processing.

Next, a flow of each processing performed by the image decoding device 400 as described above will be described. First, an example of a flow of image decoding processing will be described with reference to the flowchart of FIG. 7.

When the image decoding processing is started, in step S401, the storage buffer 411 acquires and holds (stores) a bit stream (coded data) supplied from the outside of the image decoding device 400.

In step S402, the decoding unit 412 performs the decoding processing. For example, the decoding unit 412 parses (analyzes and acquires) various coding parameters (for example, header information Hinfo, prediction mode information Pinfo, transform information Tinfo, and the like) from the bit stream. The control unit 401 supplies the acquired various coding parameters to various processing units to set the various coding parameters.

Furthermore, the control unit 401 sets a processing unit on the basis of the obtained coding parameter. Further, the decoding unit 412 decodes the bit stream and derives the quantization coefficient level according to the control of the control unit 401.

In step S403, the inverse quantization inverse transform unit 413 performs an inverse quantization inverse transform processing to derive residual data D'.

In step S404, the prediction unit 418 generates the predicted image P. For example, the prediction unit 418 performs prediction processing by a prediction method designated by the coding side on the basis of the coding parameter and the like set in step S402, and generates the predicted image P by referring to the reference image stored in the frame memory 417.

In step S405, the calculation unit 414 adds the residual data D' obtained in step S403 and the predicted image P obtained in step S404 to derive a locally decoded image.

In step S406, the in-loop filter unit 415 performs the in-loop filter processing on the locally decoded image obtained by the processing in step S405.

In step S407, the rearrangement buffer 416 derives the decoded image using the locally decoded image filtered by the processing in step S406, and rearranges the order of the decoded image group from the decoding order to the reproduction order. The decoded image group rearranged in the reproduction order is output as a moving image to the outside of the image decoding device 400.

In addition, in step S408, the frame memory 417 stores at least one of the locally decoded image obtained by the processing in step S405 or the locally decoded image filtered by the processing in step S406.

When the process of step S408 ends, the image decoding processing ends.

<Application of Present Technology to Image Decoding Processing>

In such image decoding processing, the present technology described above in <1. Clip processing of lossless inverse adaptive color transform> can be applied. That is, the inverse quantization inverse transform processing described with reference to the flowchart of FIG. 5 can be applied as the inverse quantization inverse transform processing of step S403.

By doing so, the inverse quantization inverse transform unit 413 can clip the coefficient data res_x' at a level at which the distortion of the coefficient data res_x (residual data D') after the inverse adaptive color transform does not increase. Therefore, the inverse quantization inverse transform unit 413 can suppress the increase in the load of the inverse quantization inverse transform processing while suppressing the increase in the distortion of the coefficient data res_x (residual data D') after the inverse adaptive color transform.

That is, by performing the image decoding processing as described above, the image decoding device 400 can suppress the increase in the load of the image decoding processing while suppressing the decrease in the quality of the decoded image.

Note that, in the image decoding processing (inverse quantization inverse transform processing (step S403)), the various methods (including "Method 1", "Method 1-1", "Method 1-2", "Method 2", "Method 2-1", "Method 2-2", and "Method 3") of the present technology described above in <1. Clip processing of lossless inverse adaptive color transform> can be applied. By applying any one of these methods, it is possible to obtain an effect (that is, effects similar to those described in <Application of the present technology to the inverse adaptive color transform device>) similar to that described in <Application of the present technology to an image decoding device>.

5. Fourth Embodiment

<Image Encoding Device>

Figure 8:
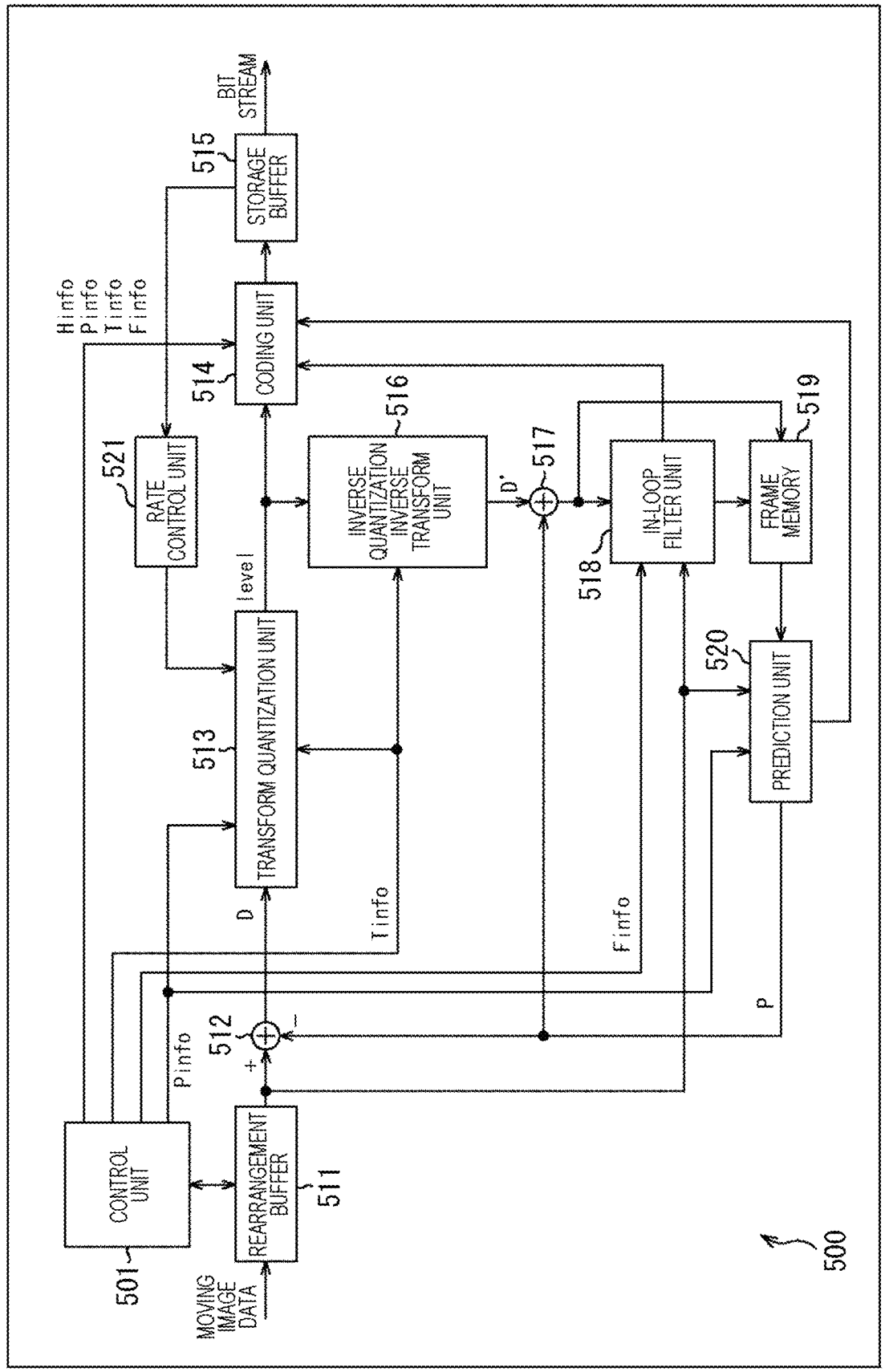
FIG. 8 is a block diagram illustrating a main configuration example of an image coding device.

The inverse quantization inverse transform device 200 (inverse quantization inverse transform process) described above can be applied to an image coding device. FIG. 8 is a block diagram illustrating an example of a configuration of an image coding device which is an aspect of an image processing apparatus to which the present technology is applied. An image coding device 500 illustrated in FIG. 8 is a device that encodes image data of a moving image. For example, the image coding device 500 encodes image data of a moving image by a coding method such as versatile video coding (VVC), advanced video coding (AVC), or high efficiency video coding (HEVC) described in the above-described Non-Patent Document. For example, the image coding device 500 can generate coded data (bit stream) that can be decoded by the above-described image decoding device 400 (FIG. 6).

Note that, in FIG. 8, main processing units, data flows, and the like are illustrated, and those illustrated in FIG. 8 are not necessarily all. That is, in the image coding device 500, there may be a processing unit not illustrated as a block in FIG. 8, or there may be processing or a data flow not illustrated as an arrow or the like in FIG. 8. The same applies to other drawings describing a processing unit and the like in the image coding device 500.

As illustrated in FIG. 8, the image coding device 500 includes a control unit 501, a rearrangement buffer 511, a calculation unit 512, a transform quantization unit 513, a coding unit 514, and a storage buffer 515. Furthermore, the image coding device 500 includes an inverse quantization inverse transform unit 516, a calculation unit 517, an in-loop filter unit 518, a frame memory 519, a prediction unit 520, and a rate control unit 521.

<Control Unit>

The control unit 501 divides the moving image data held by the rearrangement buffer 511 into blocks (CU, PU, TU, etc.) in units of processing on the basis of a block size in units of processing specified outside or in advance. Furthermore, the control unit 501 determines coding parameters (header information Hinfo, prediction mode information Pinfo, transform information Tinfo, filter information Finfo, and the like) to be supplied to each block on the basis of, for example, rate-distortion optimization (RDO). For example, the control unit 501 can set a transform skip flag or the like.

When determining the coding parameters as described above, the control unit 501 supplies the coding parameters to each block. For example, the header information Hinfo is supplied to each block. The prediction mode information Pinfo is supplied to the coding unit 514 and the prediction unit 520. The transform information Tinfo is supplied to the coding unit 514, the transform quantization unit 513, and the inverse quantization inverse transform unit 516. The filter information Finfo is supplied to the coding unit 514 and the in-loop filter unit 518. Of course, the supply destination of each coding parameter is arbitrary and is not limited to this example.

<Rearrangement Buffer>

Each field (input image) of the moving image data is input to the image coding device 500 in the reproduction order (display order). The rearrangement buffer 511 acquires and holds (stores) each input image in its reproduction order (display order). The rearrangement buffer 511 rearranges the input image in coding order (decoding order) or divides the input image into blocks in units of processing under the control of the control unit 501. The rearrangement buffer 511 supplies each processed input image to the calculation unit 512.

<Calculation Unit>

The calculation unit 512 subtracts the predicted image P supplied from the prediction unit 520 from the image corresponding to the block of the processing unit supplied from the rearrangement buffer 511 to derive the residual data D, and supplies the residual data D to the transform quantization unit 513.

<Transform Quantization Unit>

The transform quantization unit 513 acquires the residual data D supplied from the calculation unit 512. Furthermore, the transform quantization unit 513 acquires the prediction mode information Pinfo and the transform information Tinfo supplied from the control unit 501. The transform quantization unit 513 performs transform quantization processing on the residual data D on the basis of the prediction mode information Pinfo and the transform information Tinfo to derive a quantization coefficient level. In the transform quantization processing, for example, processing such as adaptive color transform, orthogonal transform, and quantization is performed. Of course, the processing included in the transform quantization processing is arbitrary, and some of the above-described processing may be omitted, or processing other than the above-described processing may be included. The transform quantization unit 513 supplies the derived quantization coefficient level to the coding unit 514 and the inverse quantization inverse transform unit 516.

<Coding Unit>

The coding unit 514 acquires the quantization coefficient level supplied from the transform quantization unit 513. Furthermore, the coding unit 514 acquires various coding parameters (header information Hinfo, prediction mode information Pinfo, transform information Tinfo, filter information Finfo, and the like) supplied from the control unit 501. Furthermore, the coding unit 514 acquires information regarding a filter such as a filter coefficient supplied from the in-loop filter unit 518. Furthermore, the coding unit 514 acquires information regarding the optimum prediction mode supplied from the prediction unit 520.

The coding unit 514 entropy encodes the quantization coefficient level (lossless coding) to generate a bit string (coded data). The coding unit 514 can apply, for example, context-based adaptive binary arithmetic code (CABAC) as the entropy coding. The coding unit 514 can apply, for example, context-based adaptive variable length code (CAVLC) as the entropy coding. Of course, the content of this entropy coding is arbitrary and is not limited to these examples.

Furthermore, the coding unit 514 derives the residual information Rinfo from the quantization coefficient level, encodes the residual information Rinfo, and generates a bit string.

Furthermore, the coding unit 514 includes the information regarding the filter supplied from the in-loop filter unit 518 in the filter information Finfo, and includes the information regarding the optimum prediction mode supplied from the prediction unit 520 in the prediction mode information Pinfo. Then, the coding unit 514 encodes the above-described various coding parameters (header information Hinfo, prediction mode information Pinfo, transform information Tinfo, filter information Finfo, and the like) to generate a bit string.

Furthermore, the coding unit 514 multiplexes the bit strings of various types of information generated as described above to generate coded data. The coding unit 514 supplies the coded data to the storage buffer 515.

<Storage Buffer>

The storage buffer 515 temporarily holds the coded data obtained in the coding unit 514. The storage buffer 515 outputs the held coded data to the outside of the image coding device 500 as, for example, a bit stream or the like at a predetermined timing. For example, the coded data is transmitted to the decoding side via an arbitrary recording medium, an arbitrary transmission medium, an arbitrary information processing device, or the like. That is, the storage buffer 515 is also a transmission unit that transmits coded data (bit stream).

<Inverse Quantization Inverse Transform Unit>

The inverse quantization inverse transform unit 516 acquires the quantization coefficient level supplied from the transform quantization unit 513. Furthermore, the inverse quantization inverse transform unit 516 acquires the transform information Tinfo supplied from the control unit 501.

The inverse quantization inverse transform unit 516 performs an inverse quantization inverse transform processing for the quantization coefficient level on the basis of the transform information Tinfo to derive residual data D'. This inverse quantization inverse transform processing is an inverse processing of the transform quantization processing performed in the transform quantization unit 513, and is processing similar to the inverse quantization inverse transform processing performed in the inverse quantization inverse transform unit 413 of the image decoding device 400 described above.

That is, in the inverse quantization inverse transform processing, for example, processes such as inverse quantization, inverse orthogonal transform, and the inverse adaptive color transform are performed. This inverse quantization is inverse processing of the quantization performed in the transform quantization unit 513, and is processing similar to the inverse quantization performed in the inverse quantization inverse transform unit 413. Furthermore, the inverse orthogonal transform is inverse processing of the orthogonal transform performed in the transform quantization unit 513, and is processing similar to the inverse orthogonal transform performed in the transform quantization unit 513. Furthermore, the inverse adaptive color transform is an inverse processing of the adaptive color transform performed in the transform quantization unit 513, and is processing similar to the inverse adaptive color transform performed in the transform quantization unit 513.

Of course, the processing included in the inverse quantization inverse transform processing is arbitrary, and some of the above-described processing may be omitted, or processing other than the above-described processing may be included. The inverse quantization inverse transform unit 516 supplies the derived residual data D' to the calculation unit 517.

<Calculation Unit>

The calculation unit 517 acquires the residual data D' supplied from the inverse quantization inverse transform unit 516 and the predicted image P supplied from the prediction unit 520. The calculation unit 517 adds the residual data D' and the predicted image P corresponding to the residual data D' to derive a locally decoded image. The calculation unit 517 supplies the derived locally decoded image to the in-loop filter unit 518 and the frame memory 519.

<In-Loop Filter Unit>

The in-loop filter unit 518 acquires the locally decoded image supplied from the calculation unit 517. In addition, the in-loop filter unit 518 acquires the filter information Finfo supplied from the control unit 501. Furthermore, the in-loop filter unit 518 acquires the input image (original image) supplied from the rearrangement buffer 511. Note that the information input to the in-loop filter unit 518 is arbitrary, and information other than these pieces of information may be input. For example, a prediction mode, motion information, a code amount target value, a quantization parameter qP, a picture type, information of a block (CU, CTU, etc.), and the like may be input to the in-loop filter unit 518 as necessary.

The in-loop filter unit 518 appropriately performs a filter processing on the locally decoded image on the basis of the filter information Finfo. The in-loop filter unit 518 also uses the input image (original image) and other input information for the filter processing as necessary.

For example, the in-loop filter unit 518 can apply a bilateral filter as the filter processing. For example, the in-loop filter unit 518 can apply a deblocking filter (DBF) as the filter processing. For example, the in-loop filter unit 518 can apply an adaptive offset filter (sample adaptive offset (SAO)) as the filter processing. For example, the in-loop filter unit 518 can apply an adaptive loop filter (ALF) as the filter processing. In addition, the in-loop filter unit 518 can apply a plurality of filters in combination as the filter processing. Note that which filter is applied and in which order the filter is applied are arbitrary and can be selected as appropriate. For example, the in-loop filter unit 518 applies four in-loop filters of a bilateral filter, a deblocking filter, an adaptive offset filter, and an adaptive loop filter in this order as the filter processing.

Of course, the filter processing performed by the in-loop filter unit 518 is arbitrary and is not limited to the above example. For example, the in-loop filter unit 518 may apply a Wiener filter or the like.

The in-loop filter unit 518 supplies the filtered locally decoded image to the frame memory 519. Note that, for example, in a case where information regarding a filter such as a filter coefficient is transmitted to the decoding side, the in-loop filter unit 518 supplies the information regarding the filter to the coding unit 514.

<Frame Memory>

The frame memory 519 performs processing related to storage of data related to an image. For example, the frame memory 519 acquires the locally decoded image supplied from the calculation unit 517 and the locally decoded image subjected to the filter processing supplied from the in-loop filter unit 518, and holds (stores) the locally decoded image. Furthermore, the frame memory 519 reconstructs and holds the decoded image for each picture unit using the locally decoded image (stores the decoded image in a buffer in the frame memory 519). The frame memory 519 supplies the decoded image (or a part thereof) to the prediction unit 520 in response to a request from the prediction unit 520.

<Prediction Unit>

The prediction unit 520 performs processing related to generation of a predicted image. For example, the prediction unit 520 acquires the prediction mode information Pinfo supplied from the control unit 501. For example, the prediction unit 520 acquires the input image (original image) supplied from the rearrangement buffer 511. For example, the prediction unit 520 acquires a decoded image (or a part thereof) read from the frame memory 519.

The prediction unit 520 performs prediction processing such as inter prediction or intra prediction using the prediction mode information Pinfo and the input image (original image). That is, the prediction unit 520 generates the predicted image P by performing prediction and motion compensation with reference to the decoded image as a reference image. The prediction unit 520 supplies the generated predicted image P to the calculation unit 512 and the calculation unit 517. Furthermore, the prediction unit 520 supplies information regarding the prediction mode selected by the above processing, that is, the optimum prediction mode, to the coding unit 514 as necessary.

<Rate Control Unit>

A rate control unit 521 performs processing related to rate control. For example, the rate control unit 521 controls the rate of the quantization operation of the transform quantization unit 513 so that overflow or underflow does not occur on the basis of the code amount of the coded data accumulated in the storage buffer 515.

<Transform Quantization Unit>

Figure 9:
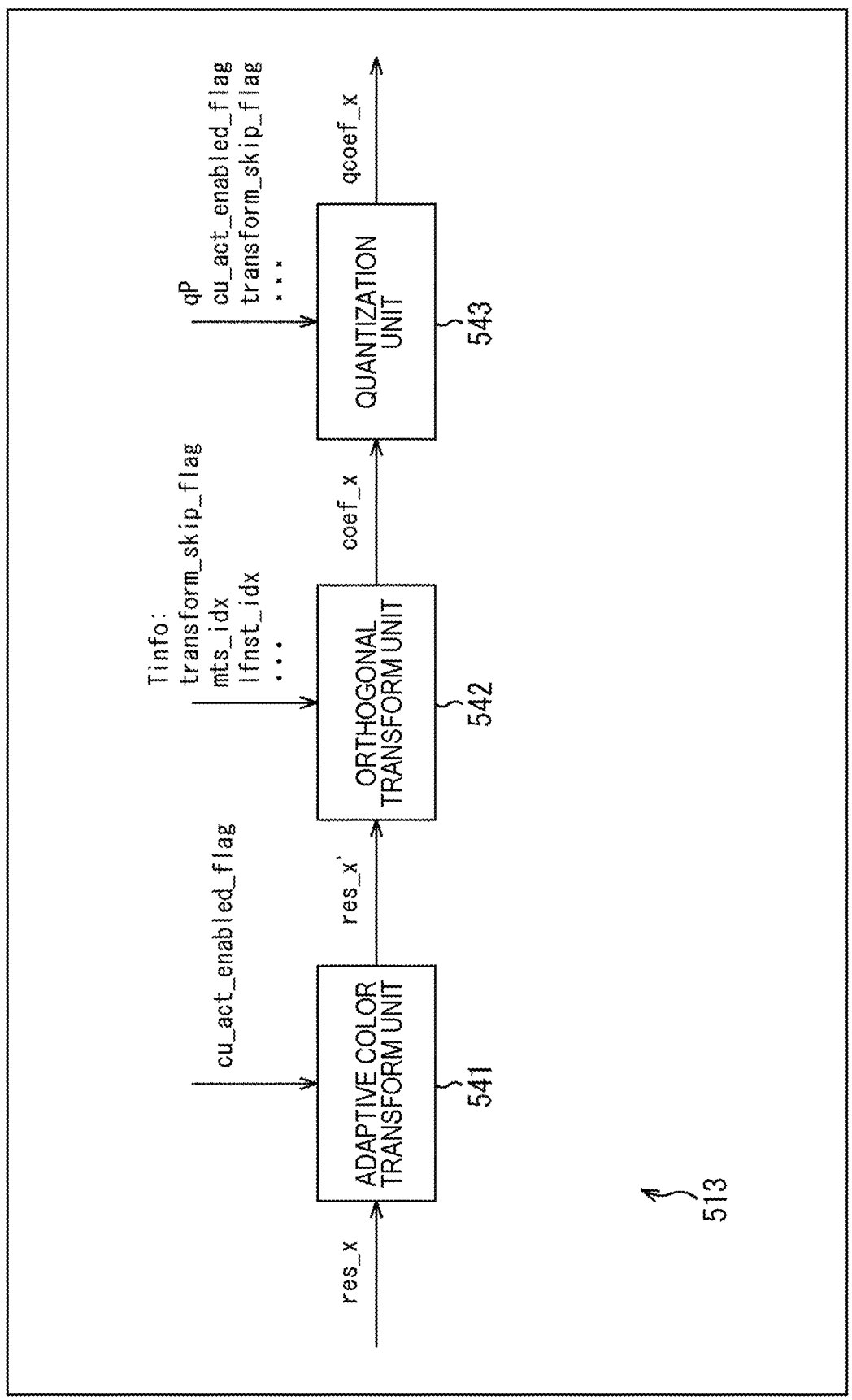
FIG. 9 is a block diagram illustrating a main configuration example of a transform quantization unit.

FIG. 9 is a block diagram illustrating a main configuration example of the transform quantization unit 513 in FIG. 8. As illustrated in FIG. 9, the transform quantization unit 513 includes an adaptive color transform unit 541, an orthogonal transform unit 542, and a quantization unit 543.

The adaptive color transform unit 541 acquires the residual data D (FIG. 8) supplied from the calculation unit 512 as the coefficient data res_x Furthermore, the adaptive color transform unit 541 acquires cu_act_enabled_flag supplied from the control unit 501. The adaptive color transform unit 541 performs adaptive color transform on the coefficient data res_x on the basis of the value of cu_act_enabled_flag. For example, when the cu_act_enabled_flag is true (for example, "1"), the adaptive color transform unit 541 performs lossless adaptive color transform (YCgCo-R transform), and transforms the coefficient data res_x in the RGB domain into the coefficient data res_x' in the YCgCo domain. The adaptive color transform is inverse processing of the inverse adaptive color transform performed in the inverse quantization inverse transform unit 413 or the inverse quantization inverse transform unit 516. The adaptive color transform unit 541 supplies the derived coefficient data res_x' to the orthogonal transform unit 542.

The orthogonal transform unit 542 acquires the coefficient data res_x' supplied from the adaptive color transform unit 541. The orthogonal transform unit 542 acquires information such as transform information Tinfo, transform_skip_flag, mts_idx, and lfnst_idx supplied from the control unit 501. The orthogonal transform unit 542 orthogonally transforms the coefficient data res_x' using the acquired information to derive an orthogonal transform coefficient coef_x. This orthogonal transform is inverse processing of the inverse orthogonal transform performed in the inverse quantization inverse transform unit 413 or the inverse quantization inverse transform unit 516. The orthogonal transform unit 542 supplies the derived orthogonal transform coefficient coef_x to the quantization unit 543.

The quantization unit 543 acquires the orthogonal transform coefficient coeff_x supplied from the orthogonal transform unit 542. Furthermore, the quantization unit 543 acquires information such as the quantization parameter qP, cu_act_enabled_flag, and transform_skip_flag supplied from the control unit 501. The quantization unit 543 quantizes the orthogonal transform coefficient coef_x using the acquired information and derives the quantization coefficient qcoef_x. The quantization is inverse processing of inverse quantization performed in the inverse quantization inverse transform unit 413 or the inverse quantization inverse transform unit 516. The quantization unit 543 supplies the derived quantization coefficient qcoef_x to the coding unit 514 and the inverse quantization inverse transform unit 516 (FIG. 8) as a quantization coefficient level.

<Adaptive Color Transform Unit>

Figure 10:
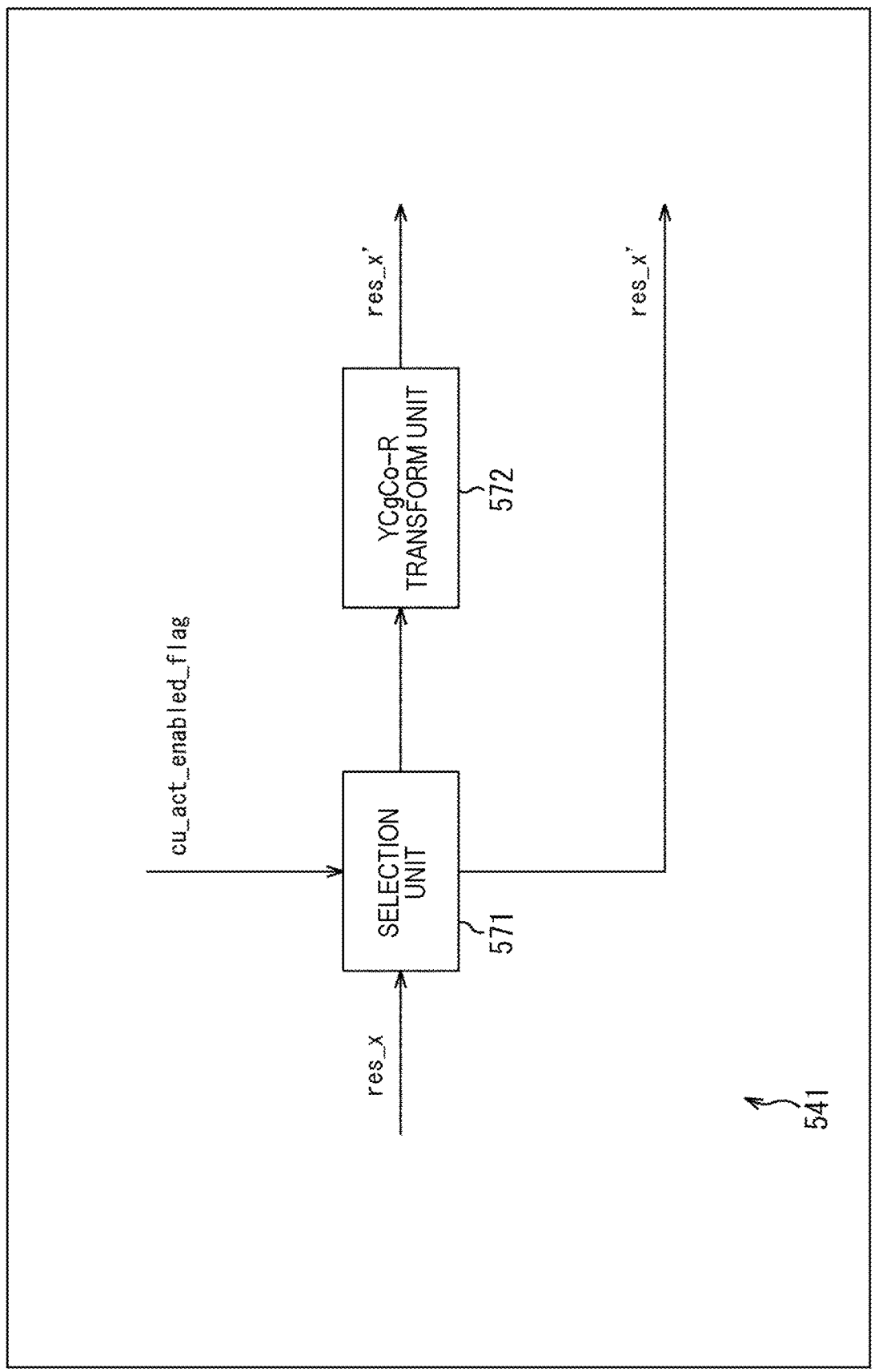
FIG. 10 is a block diagram illustrating a main configuration example of an adaptive color transform unit.

FIG. 10 is a block diagram illustrating a main configuration example of the adaptive color transform unit 541 in FIG. 9. As illustrated in FIG. 10, the adaptive color transform unit 541 includes a selection unit 571 and a YCgCo-R transform unit 572.

The selection unit 571 acquires the residual data D (FIG. 8) supplied from the calculation unit 512 as the coefficient data res_x. Furthermore, the selection unit 571 acquires cu_act_enabled_flag supplied from the control unit 501. The selection unit 571 selects whether or not to perform the adaptive color transform on the acquired coefficient data res_x on the basis of the value of cu_act_enabled_flag. For example, when the cu_act_enabled_flag is true (for example, "1"), the selection unit 571 determines that adaptive color transform is applicable, and supplies the coefficient data res_x to the YCgCo-R transform unit 572.

For example, when the cu_act_enabled_flag is false (for example, "0"), the selection unit 571 determines that the application of the adaptive color transform (the inverse adaptive color transform) is prohibited (that is, not applicable), and supplies the coefficient data res_x to the orthogonal transform unit 542 (FIG. 9) as the coefficient data res_x' after the applied color transform.

The YCgCo-R transform unit 572 acquires the coefficient data res_x supplied from the selection unit 101. The YCgCo-R transform unit 572 performs the YCgCo-R transform on the acquired coefficient data res_x to derive coefficient data res_x' subjected to the YCgCo-R transform. This YCgCo-R transform is inverse processing of the inverse YCgCo-R transform performed in the inverse quantization inverse transform unit 413 or the inverse quantization inverse transform unit 516. The YCgCo-R transform unit 572 supplies the derived coefficient data res_x' to the orthogonal transform unit 542 (FIG. 9).

<Application of Present Technology to Image Encoding Device>

In such an image coding device 500 (FIG. 8), the present technology described above in <1. Clip processing of lossless inverse adaptive color transform> can be applied. That is, the image coding device 500 can apply the inverse quantization inverse transform device 200 described in the second embodiment as the inverse quantization inverse transform unit 516. In that case, the inverse quantization inverse transform unit 516 has a configuration similar to that of the inverse quantization inverse transform device 200 (FIG. 4) and performs similar processing.

For example, in the inverse quantization inverse transform unit 516, the inverse quantization unit 201 acquires the quantization coefficient level supplied from the transform quantization unit 513 as the quantization coefficient qcoef_x. Then, the inverse quantization unit 201 inversely quantizes the quantization coefficient qcoef_x by using information such as the quantization parameter qP, cu_act_enabled_flag, and transform_skip_flag supplied from the control unit 501, and derives the orthogonal transform coefficient coef_x.

The inverse orthogonal transform unit 202 inversely orthogonally transforms the orthogonal transform coefficient coef_x derived by the inverse quantization unit 201, using the information such as the transform information Tinfo, transform_skip_flag, mts_idx, and lfnst_idx supplied from the control unit 501, and derives coefficient data res_x'.

On the basis of the cu_act_enabled_flag supplied from the control unit 501, the inverse adaptive color transform unit 203 appropriately performs the inverse adaptive color transform (inverse YCgCo-R transform) on the coefficient data res_x' derived by the inverse orthogonal transform unit 202 by the lossless method to derive coefficient data res_x after the inverse adaptive color transform processing. The inverse adaptive color transform unit 203 supplies the derived coefficient data res_x to the calculation unit 517 as residual data D'.

As described in the first embodiment, the inverse adaptive color transform unit 203 has a configuration similar to that of the inverse adaptive color transform device 100, and performs similar processing. For example, in the inverse adaptive color transform unit 203, the clip processing unit 102 clips the coefficient data res_x' supplied from the inverse orthogonal transform unit 202 at a level based on the bit depth of the coefficient data. Then, the inverse YCgCo-R transform unit 103 performs the inverse YCgCo-R transform on the coefficient data res_x' clipped at the level by the clip processing unit 102 to derive coefficient data res_x after the inverse adaptive color transform processing. Then, the inverse YCgCo-R transform unit 103 supplies the derived coefficient data res_x to the calculation unit 517 as the residual data D'.

By doing so, the inverse quantization inverse transform unit 516 can perform the clip on the coefficient data res_x' at a level at which the distortion of the coefficient data res_x after the inverse adaptive color transform does not increase. Therefore, similarly to the case of the inverse quantization inverse transform device 200, the inverse quantization inverse transform unit 516 can suppress the increase in the load of the inverse quantization inverse transform processing while suppressing the increase in the distortion of the coefficient data res_x (residual data D') to be output. That is, the image coding device 500 can suppress the increase in the load of the image coding processing while suppressing a reduction in the quality of the decoded image.

Then, as in the case of the inverse quantization inverse transform device 200, the inverse quantization inverse transform unit 516 can apply the various methods (including "Method 1", "Method 1-1", "Method 1-2", "Method 2", "Method 2-1", "Method 2-2", and "Method 3") of the present technology described above in <1. Clip processing of lossless inverse adaptive color transform>. That is, the image coding device 500 can apply the various methods of the present technology described above in <1. Clip processing of lossless inverse adaptive color transform>. By applying any one of these methods, the image coding device 500 can obtain an effect (that is, effects similar to those described in <Application of the present technology to the inverse adaptive color transform device>) similar to that described in <Application of the present technology to inverse quantization inverse transform device>.

<Flow of Image Coding Processing>

Next, an example of a flow of image coding processing performed by the image coding device 500 as described above will be described with reference to a flowchart in FIG. 11.

When the image coding processing is started, in step S501, the rearrangement buffer 511 is controlled by the control unit 501 to rearrange the order of the frames of the input moving image data from the display order to the coding order.

In step S502, the control unit 501 sets a processing unit (divides a block) for the input image held by the rearrangement buffer 511.

In step S503, the control unit 501 sets the coding parameters (for example, header information Hinfo, prediction mode information Pinfo, transform information Tinfo, and the like) for the input image held by the rearrangement buffer 511.

In step S504, the prediction unit 520 performs prediction processing and generates a predicted image or the like in an optimum prediction mode. For example, in this prediction processing, the prediction unit 520 performs intra prediction to generate a predicted image or the like in an optimum intra prediction mode, performs inter prediction to generate a predicted image or the like in an optimum inter prediction mode, and selects an optimum prediction mode from the predicted images on the basis of a cost function value or the like.

In step S505, the calculation unit 512 calculates a difference between the input image and the predicted image in the optimum mode selected by the prediction processing in step S504. That is, the calculation unit 512 derives the residual data D between the input image and the predicted image. The residual data D derived in this way has a smaller data amount than the original image data. Therefore, the amount of data can be compressed as compared with a case where an image is encoded as it is.

In step S506, the transform quantization unit 513 performs the transform quantization processing on the residual data D derived by the processing in step S505 by using the coding parameter such as the transform information Tinfo set in step S503, and derives the quantization coefficient level.

In step S507, the inverse quantization inverse transform unit 516 performs the inverse quantization inverse transform processing on the quantization coefficient level derived in step S506 by using the coding parameter such as the transform information Tinfo set in step S503, and derives residual data D'. This inverse quantization inverse transform processing is an inverse processing of the transform quantization processing of step S506, and is processing similar to the inverse quantization inverse transform processing of step S403 of the image decoding processing of FIG. 7.

In step S508, the calculation unit 517 adds the predicted image generated by the prediction processing in step S504 to the residual data D' derived by the inverse quantization inverse transform processing in step S507, thereby generating the locally decoded image.

In step S509, the in-loop filter unit 518 performs the in-loop filter processing on the locally decoded image derived by the processing in step S508.

In step S510, the frame memory 519 stores the locally decoded image derived by the processing in step S508 and the locally decoded image filtered in step S509.

In step S511, the coding unit 514 encodes the quantization coefficient level derived by the transform quantization processing in step S506 to derive coded data. Furthermore, at this time, the coding unit 514 encodes various coding parameters (header information Hinfo, prediction mode information Pinfo, and transform information Tinfo). Further, the coding unit 514 derives the residual information RInfo from the quantization coefficient level and encodes the residual information RInfo.

In step S512, the storage buffer 515 stores the coded data derived in this way and outputs the coded data as, for example, a bit stream to the outside of the image coding device 500. This bit stream is transmitted to a decoding side device (for example, the image decoding device 400) via a transmission path or a recording medium, for example. In addition, the rate control unit 521 controls the rate as necessary. When the process of step S512 ends, the image coding processing ends.

<Flow of Transform Quantization Processing>

Next, an example of a flow of the transform quantization processing performed in step S506 of FIG. 11 will be described with reference to a flowchart of FIG. 12.

When the transform quantization processing is started, in step S541, the adaptive color transform unit 541 performs the adaptive color transform on the coefficient data res_x derived by the process of step S505 on the basis of the cu_act_enabled_flag set in step S503 (FIG. 11) to derive the coefficient data res_x'.

In step S542, the orthogonal transform unit 542 orthogonally transforms the coefficient data res_x' derived in step S541 by using the transform information Tinfo, the prediction mode information Pinfo, and the like set in step S503 (FIG. 11), and derives the orthogonal transform coefficient coef_x.

In step S543, the quantization unit 543 quantizes the orthogonal transform coefficient coef_x derived in step S542 by using the transform information Tinfo and the like set in step S503 (FIG. 11), and derives the quantization coefficient qcoef_x.

Figure 11:
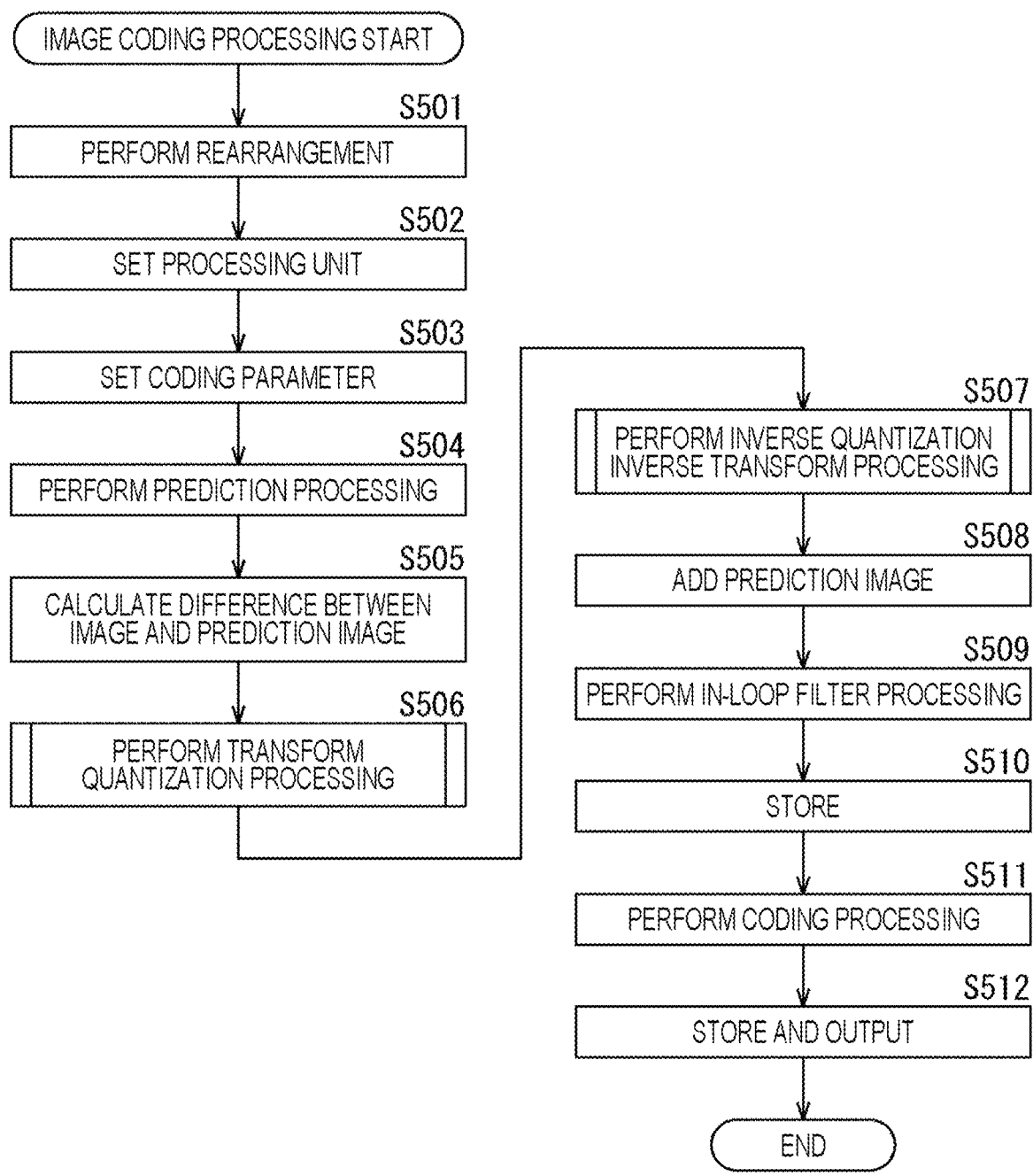
FIG. 11 is a flowchart illustrating an example of a flow of image coding processing.
Figure 12:
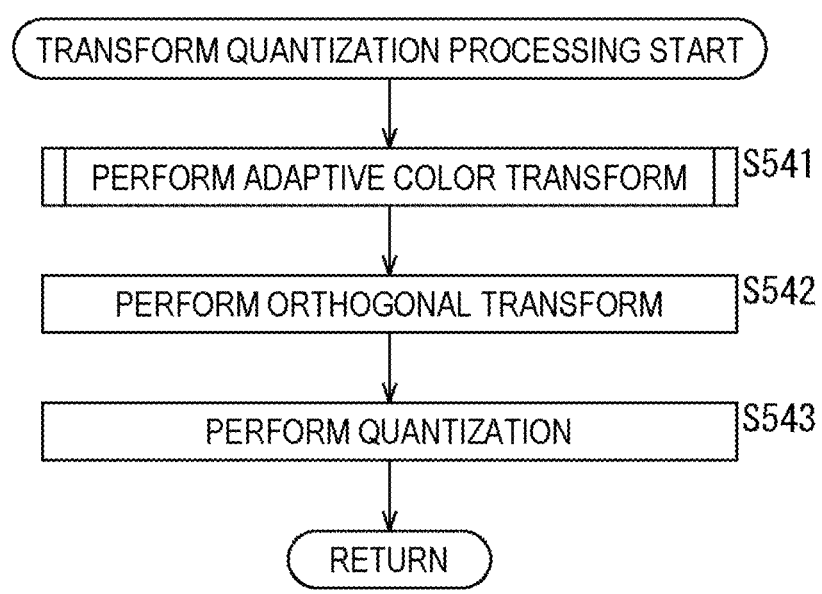
FIG. 12 is a flowchart for describing an example of a flow of transform quantization processing.

When the process of step S543 ends, the process returns to FIG. 11.

<Flow of Adaptive Color Transform Processing>

Figure 13:
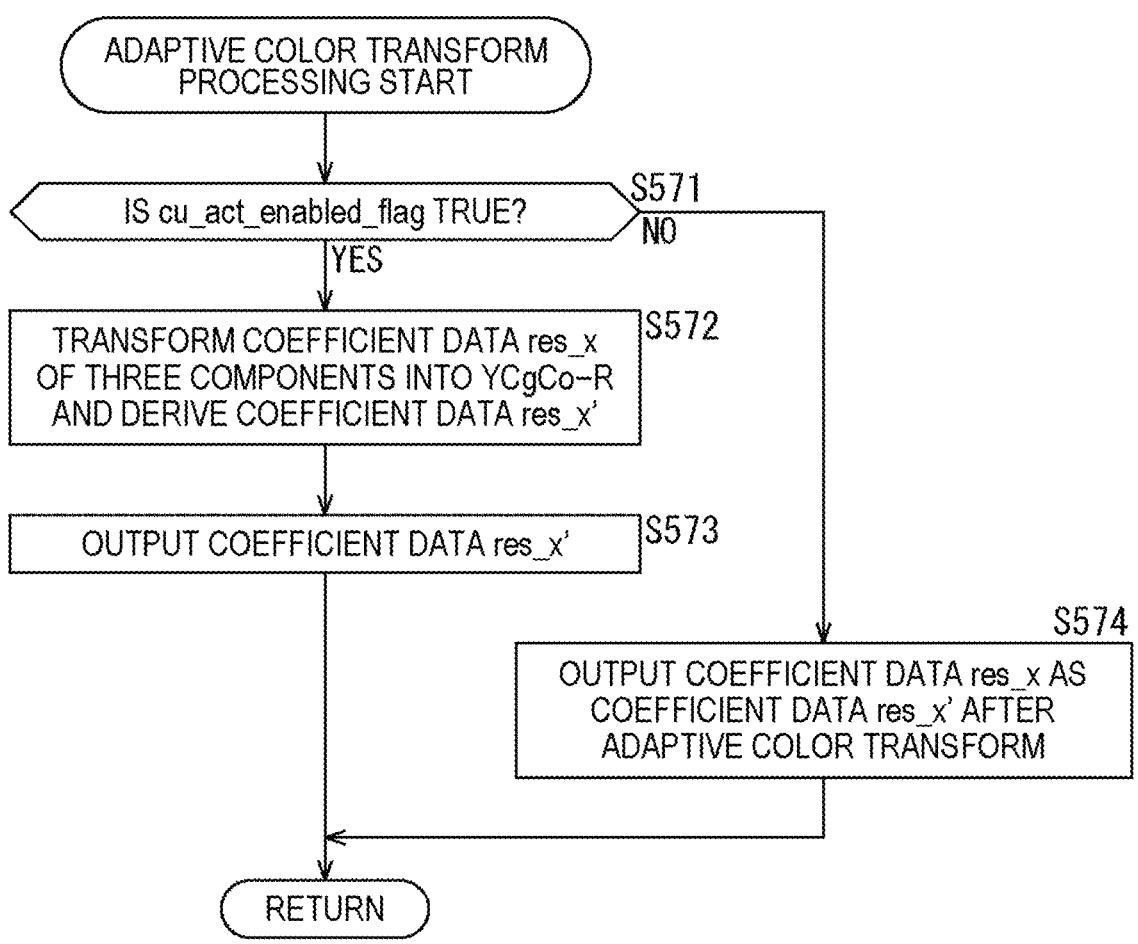
FIG. 13 is a flowchart for describing an example of a flow of adaptive color transform processing.

Next, an example of a flow of the adaptive color transform processing performed in step S541 of FIG. 12 will be described with reference to a flowchart of FIG. 13.

When the adaptive color transform processing is started, the selection unit 571 of the adaptive color transform unit 541 determines in step S571 whether or not the cu_act_enabled_flag is true. In a case where the cu_act_enabled_flag is determined to be true, the process proceeds to step S572.

In step S572, the YCgCo-R transform unit 572 performs the YCgCo-R transform on the coefficient data res_x of the three components to derive coefficient data res_x' after the adaptive color transform.

In step S573, the YCgCo-R transform unit 572 supplies the derived coefficient data res_x' to the orthogonal transform unit 542. When the process of step S573 ends, the adaptive color transform processing ends.

Furthermore, in a case where the cu_act_enabled_flag is determined to be false in step S571, the process proceeds to step S574.

In step S574, the selection unit 571 supplies the coefficient data res_x to the orthogonal transform unit 542 as the coefficient data res_x' after the adaptive color transform. When the process of step S574 ends, the adaptive color transform processing ends.

<Application of Present Technology to Image Coding Processing>

In such image coding processing, the present technology described above in <1. Clip processing of lossless inverse adaptive color transform> can be applied. That is, the inverse quantization inverse transform processing described with reference to the flowchart of FIG. 5 can be applied as the inverse quantization inverse transform processing of step S507.

By doing so, the inverse quantization inverse transform unit 516 can clip the coefficient data res_x' at a level at which the distortion of the coefficient data res_x (residual data D') after the inverse adaptive color transform does not increase. Therefore, the inverse quantization inverse transform unit 516 can suppress the increase in the load of the inverse quantization inverse transform processing while suppressing the increase in the distortion of the coefficient data res_x (residual data D') after the inverse adaptive color transform.

That is, by performing the image coding processing as described above, the image coding device 500 can suppress the increase in the load of the image coding processing while suppressing a reduction in the quality of the decoded image.

Note that, in the image coding processing (inverse quantization inverse transform processing (step S507)), the various methods (including "Method 1", "Method 1-1", "Method 1-2", "Method 2", "Method 2-1", "Method 2-2", and "Method 3") of the present technology described above in <1. Clip processing of lossless inverse adaptive color transform> can be applied. By applying any one of these methods, it is possible to obtain an effect (that is, effects similar to those described in <Application of the present technology to the inverse adaptive color transform device>)

6. Appendix

<Computer>

The above-described series of processing can be performed by hardware or software. In a case where the series of processing is performed by software, a program constituting the software is installed in a computer. Here, the computer includes a computer incorporated in dedicated hardware, a general-purpose personal computer capable of performing various functions by installing various programs, and the like, for example.

Figure 14:
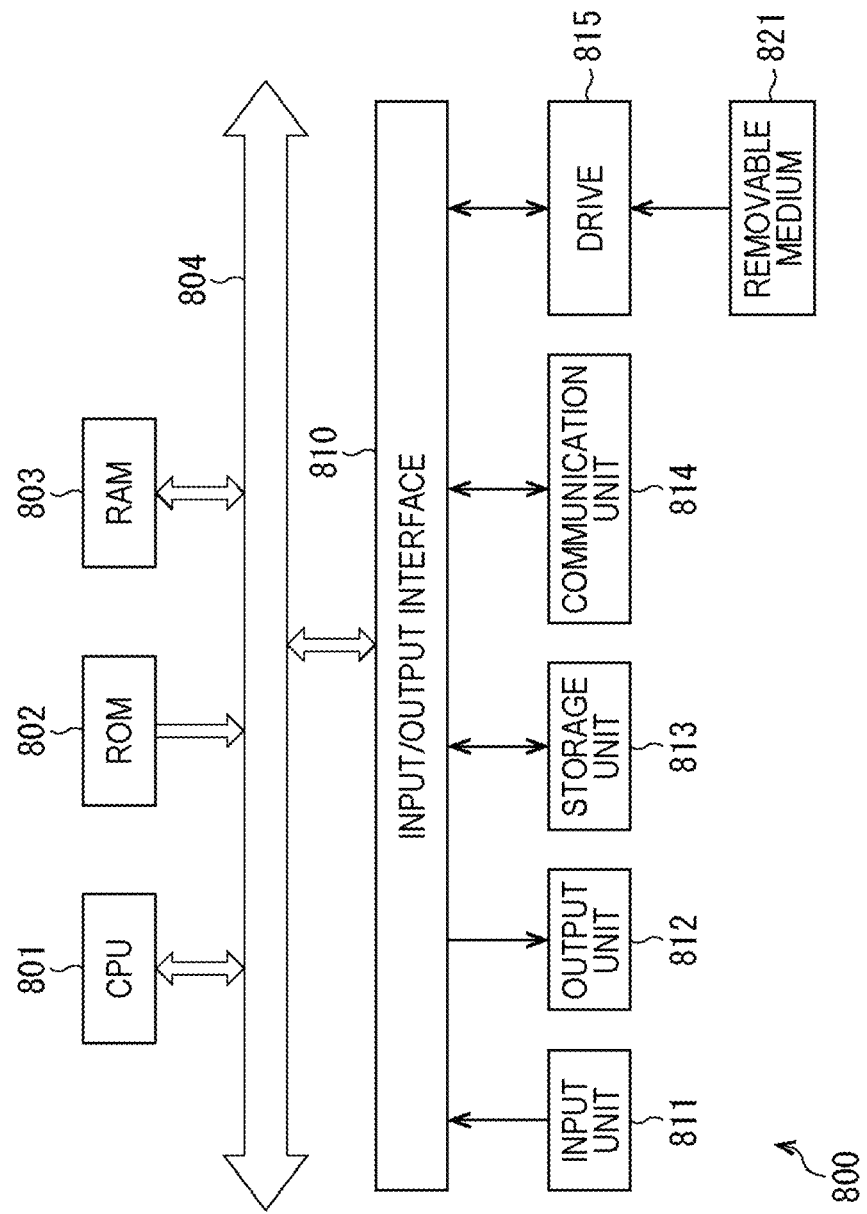
FIG. 14 is a block diagram illustrating a main configuration example of a computer.

FIG. 14 is a block diagram illustrating a configuration example of hardware of a computer that performs the above-described series of processing by a program.

In a computer 800 illustrated in FIG. 14, a central processing unit (CPU) 801, a read only memory (ROM) 802, and a random access memory (RAM) 803 are mutually connected via a bus 804.

An input/output interface 810 is also connected to the bus 804. An input unit 811, an output unit 812, a storage unit 813, a communication unit 814, and a drive 815 are connected to the input/output interface 810.

The input unit 811 includes, for example, a keyboard, a mouse, a microphone, a touch panel, an input terminal, and the like. The output unit 812 includes, for example, a display, a speaker, an output terminal, and the like. The storage unit 813 includes, for example, a hard disk, a RAM disk, a nonvolatile memory, and the like. The communication unit 814 includes, for example, a network interface. The drive 815 drives a removable medium 821 such as a magnetic disk, an optical disk, a magneto-optical disk, or a semiconductor memory.

In the computer configured as described above, for example, the CPU 801 loads a program stored in the storage unit 813 into the RAM 803 via the input/output interface 810 and the bus 804 and performs the program, so the above-described series of processing is performed. The RAM 803 also appropriately stores data and the like necessary for the CPU 801 to perform various processings.

The program performed by the computer can be applied by being recorded in the removable medium 821 as a package medium or the like, for example. In this case, the program can be installed in the storage unit 813 via the input/output interface 810 by attaching the removable medium 821 to the drive 815.

Furthermore, this program can also be provided via a wired or wireless transmission medium such as a local area network, the Internet, or digital satellite broadcasting. In this case, the program can be received by the communication unit 814 and installed in the storage unit 813.

In addition, this program can be installed in the ROM 802 or the storage unit 813 in advance.

<Object to which Present Technology is Applied>

The present technology can be applied to any image coding system or decoding system. That is, as long as there is no contradiction with the present technology described above, specifications of various processings related to image coding/decoding such as transform (inverse transform), quantization (inverse quantization), coding (decoding), and prediction are arbitrary, and are not limited to the examples described above. In addition, as long as there is no contradiction with the present technology described above, some of these processings may be omitted.

Furthermore, the present technology can be applied to a multi-view image coding system that encodes a multi-view image including images of a plurality of viewpoints (views). Furthermore, the present technology can be applied to a multi-view image decoding system that decodes coded data of a multi-view image including images of a plurality of viewpoints (views). In that case, the present technology is only required to be applied to coding and decoding of each viewpoint (view).

Furthermore, the present technology can be applied to a hierarchical image coding (scalable coding) system that encodes a hierarchical image layered (hierarchized) so as to have a scalability function for a predetermined parameter. Furthermore, the present technology can be applied to a hierarchical image decoding (scalable decoding) system that decodes coded data of a hierarchical image layered (hierarchized) so as to have a scalability function for a predetermined parameter. In that case, the present technology is only required to be applied to coding and decoding of each layer (layer).

Furthermore, the inverse adaptive color transform device 100, the inverse quantization inverse transform device 200, the image decoding device 400, and the image coding device 500 have been described above as application examples of the present technology, but the present technology can be applied to an arbitrary configuration.

For example, the present technology can be applied to various electronic devices such as a transmitter and a receiver (for example, a television receiver and a mobile phone) in satellite broadcasting, cable broadcasting such as cable TV, distribution on the Internet, and distribution to a terminal by cellular communication, or a device (for example, a hard disk recorder and a camera) that records an image on a medium such as an optical disk, a magnetic disk, and a flash memory, or reproduces an image from the storage medium.

Furthermore, for example, the present technology can also be implemented as a partial configuration of an apparatus, such as a processor (for example, a video processor) as a system large scale integration (LSI) or the like, a module (for example, a video module) using a plurality of processors or the like, a unit (for example, a video unit) using a plurality of modules or the like, or a set (for example, a video set) obtained by further adding other functions to a unit.

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service related to an image (moving image) to an arbitrary terminal such as a computer, an audio visual (AV) device, a portable information processing terminal, or an Internet of Things (IoT) device.

Note that, in the present specification, a system means a set of a plurality of components (devices, modules (parts), etc.), and it does not matter whether or not all the components are in the same housing. Therefore, a plurality of devices housed in separate housings and connected via a network and one device in which a plurality of modules is housed in one housing are both systems.

<Field and Application to which Present Technology is Applicable>

The system, the device, the processing unit, and the like to which the present technology is applied can be used in arbitrary fields such as traffic, medical care, crime prevention, agriculture, livestock industry, mining, beauty, factory, home appliance, weather, and natural monitoring. In addition, the application thereof is also arbitrary.

For example, the present technology can be applied to a system or a device provided for providing content for appreciation or the like. Furthermore, for example, the present technology can also be applied to systems and devices provided for traffic, such as traffic condition supervision and automatic driving control. Furthermore, for example, the present technology can also be applied to a system or a device provided for security.

Furthermore, for example, the present technology can be applied to a system or a device provided for automatic control of a machine or the like. Furthermore, for example, the present technology can also be applied to systems and devices used for agriculture and livestock industry. Furthermore, the present technology can also be applied to a system and a device that monitor natural states such as volcanoes, forests, and oceans, wildlife, and the like. Furthermore, for example, the present technology can also be applied to systems and devices provided for sports.

<Others>

Note that, in the present specification, the "flag" is information for identifying a plurality of states, and includes not only information used for identifying two states of true (1) and false (0) but also information capable of identifying three or more states. Therefore, the value that can be taken by the "flag" may be, for example, a binary of I/0 or a ternary or more. That is, the number of bits constituting this "flag" is arbitrary, and may be one bit or a plurality of bits. In addition, since the identification information (including the flag) is assumed to include not only the identification information in the bit stream but also the difference information of the identification information with respect to certain reference information in the bit stream, in the present specification, the "flag" and the "identification information" include not only the information but also the difference information with respect to the reference information.

Furthermore, various types of information (metadata and the like) related to the coded data (bit stream) may be transmitted or recorded in any form as long as the information is associated with the coded data. Here, the term "associate" means, for example, that one data can be used (linked) when the other data is processed. That is, the data associated with each other may be collected as one data or may be individual data. For example, information associated with coded data (image) may be transmitted on a transmission path different from that of the coded data (image). Furthermore, for example, the information associated with the coded data (image) may be recorded in a recording medium (or another recording area of the same recording medium) different from the coded data (image). Note that this "association" may be a part of data instead of the entire data. For example, an image and information corresponding to the image may be associated with each other in an arbitrary unit such as a plurality of frames, one frame, or a part in a frame.

Note that, in the present specification, terms such as "combine", "multiplex", "add", "integrate", "include", "store", "insert", and "insert" mean to combine a plurality of items into one, for example, to combine coded data and metadata into one data, and mean one method of the above-described "associate".

Furthermore, the embodiments of the present technology are not limited to the above-described embodiments, and various modifications can be made without departing from the gist of the present technology.

For example, a configuration described as one device (or processing unit) may be divided and configured as a plurality of devices (or processing units). Conversely, configurations described above as a plurality of devices (or processing units) may be collectively configured as one device (or processing unit).

Furthermore, a configuration other than the above-described configuration may be added to the configuration of each device (or each processing unit). Furthermore, as long as the configuration and operation of the entire system are substantially the same, a part of the configuration of a certain device (or processing unit) may be included in the configuration of another device (or another processing unit).

Furthermore, for example, the above-described program may be performed in an arbitrary device. In that case, it is sufficient that the device has a necessary function (functional block or the like) and can obtain necessary information.

Furthermore, for example, each step of one flowchart may be performed by one device, or may be shared and performed by a plurality of devices. Furthermore, in a case where a plurality of processes is included in one step, the plurality of processes may be performed by one device, or may be shared and performed by a plurality of devices. In other words, a plurality of processes included in one step can also be performed as processes of a plurality of steps. Conversely, the processes described as a plurality of steps can be collectively performed as one step.

In addition, the program performed by the computer may have the following features. For example, the processes of steps describing the program may be performed in time series in the order described in the present specification. In addition, processes of steps describing the program may be performed in parallel. Furthermore, the processes of steps describing the program may be individually performed at necessary timing such as when called. That is, as long as there is no contradiction, the processes of each step may be performed in an order different from the above-described order. In addition, processes of steps describing this program may be performed in parallel with processes of another program. Furthermore, processes of steps describing this program may be performed in combination with processes of another program.

Furthermore, for example, a plurality of techniques related to the present technology can be implemented independently as a single body as long as there is no contradiction. Of course, a plurality of arbitrary present technologies can be implemented in combination. For example, some or all of the present technology described in any of the embodiments can be implemented in combination with some or all of the present technology described in other embodiments. Furthermore, some or all of the above-described arbitrary present technology can be implemented in combination with other technologies not described above.

Note that the present technology may also be configured as below.

(1) An image processing apparatus including:

a clipping processing unit configured to clip coefficient data subjected to lossless adaptive color transform at a level based on a bit depth of the coefficient data; and an inverse adaptive color transform unit configured to perform inverse adaptive color transform on the coefficient data clipped at the level by the clip processing unit by the lossless method.

(2) The image processing apparatus described in (1), in which
the clip processing unit clips a luminance component and a color component of the coefficient data at the same level as each other.

(3) The image processing apparatus described in (2), in which
the clip processing unit
clips the luminance component and the color component of the coefficient data with, as an upper bound, a value obtained by subtracting 1 from a power of 2 with a value obtained by adding 1 to the bit depth as a power index, and
clips the luminance component and the color component of the coefficient data with, as a lower bound, a value obtained by multiplying −1 by a power of 2 with a value obtained by adding 1 to the bit depth as a power index.

(4) The image processing apparatus described in (2), in which
the level is a value based on the bit depth and a dynamic range of a buffer that stores the coefficient data.

(5) The image processing apparatus described in (4), in which
the level is a value derived using a smaller one of a value based on the bit depth and not based on the dynamic range of the buffer and a value not based on the bit depth and based on the dynamic range of the buffer.

(6) The image processing apparatus described in (5), in which
the clip processing unit
clips the luminance component and the color component of the coefficient data with, as an upper bound, a value obtained by subtracting 1 from a power of 2 with a smaller one of a value obtained by adding 1 to the bit depth and a value obtained by subtracting 1 from the dynamic range of the buffer as a power index, and
clips the luminance component and the color component of the coefficient data with, as a lower bound, a value obtained by multiplying −1 by a power of 2 with a smaller one of a value obtained by adding 1 to the bit depth and a value obtained by subtracting 1 from the dynamic range of the buffer as a power index.

(7) The image processing apparatus described in (1), in which
the clip processing unit
clips a luminance component of the coefficient data at a first level, and
clips a color component of the coefficient data at a second level.

(8) The image processing apparatus described in (7), in which
the second level has a wider difference between upper and lower bounds than that of the first level.

(9) The image processing apparatus described in (8), in which
the clip processing unit
clips the luminance component of the coefficient data with, as an upper bound, a value obtained by subtracting 1 from a power of 2 with the bit depth as a power index,
clips the luminance component of the coefficient data with, as a lower bound, a value obtained by multiplying −1 by a power of 2 with the bit depth as a power index,
clips the color component of the coefficient data with, as an upper bound, a value obtained by subtracting 1 from a power of 2 with a value obtained by adding 1 to the bit depth as a power index, and
clips the color component of the coefficient data with, as a lower bound, a value obtained by multiplying −1 by a power of 2 with a value obtained by adding 1 to the bit depth as a power index.

(10) The image processing apparatus described in (7), in which
the first level and the second level are values based on the bit depth and a dynamic range of a buffer that stores the coefficient data.

(11) The image processing apparatus described in (10), in which
the clip processing unit
clips the luminance component of the coefficient data with, as an upper bound, a value obtained by subtracting 1 from a power of 2 with a smaller one of the bit depth and a value obtained by subtracting 1 from the dynamic range of the buffer as a power index,
clips the luminance component of the coefficient data with, as a lower bound, a value obtained by multiplying −1 by a power of 2 with a smaller one of the bit depth and a value obtained by subtracting 1 from the dynamic range of the buffer as the power index,
clips the color component of the coefficient data with, as an upper bound, a value obtained by subtracting 1 from a power of 2 with a smaller one of a value obtained by adding 1 to the bit depth and a value obtained by subtracting 1 from the dynamic range of the buffer as the power index, and
clips the color component of the coefficient data with, as a lower bound, a value obtained by multiplying −1 by a power of 2 with a smaller one of a value obtained by adding 1 to the bit depth and a value obtained by subtracting 1 from the dynamic range of the buffer as the power index.

(12) The image processing apparatus described in (1), in which
the level is a value based on a dynamic range of a buffer that stores the coefficient data.

(13) The image processing apparatus described in (12), in which
the clip processing unit
clips a luminance component and a color component of the coefficient data with, as an upper bound, a value obtained by subtracting 1 from a power of 2 with a value obtained by subtracting 1 from the dynamic range of the buffer as a power index, and
clips the luminance component and the color component of the coefficient data with, as a lower bound, a value obtained by multiplying −1 by a power of 2 with a value obtained by subtracting 1 from the dynamic range of the buffer as a power index.

(14) The image processing apparatus described in (1), further including:
an inverse orthogonal transform unit configured to inversely orthogonally transform an orthogonal transform coefficient to generate the coefficient data subjected to lossless adaptive color transform,
in which the clip processing unit is configured to clip the coefficient data generated by the inverse orthogonal transform unit at the level.

(15) The image processing apparatus described in (14), further including:
an inverse quantization unit configured to inversely quantize a quantization coefficient and generate the orthogonal transform coefficient,
in which the inverse orthogonal transform unit is configured to inversely orthogonally transform the orthogonal transform coefficient generated by the inverse quantization unit.

(16) The image processing apparatus described in (15), further including a decoding unit configured to decode coded data and generate the quantization coefficient, in which the inverse quantization unit is configured to inversely quantize the quantization coefficient generated by the decoding unit.

(17) The image processing apparatus described in (16), in which the inverse adaptive color transform unit is configured to perform inverse adaptive color transform on the coefficient data clipped at the level by the clipping processing unit by the lossless method to generate prediction residual data of image data, and the image processing apparatus further includes a calculation unit configured to add prediction data of the image data to the prediction residual data generated by the inverse adaptive color transform unit to generate the image data.

(18) The image processing apparatus described in (15), further including a transform quantization unit configured to perform adaptive color transform on image data by a lossless method to generate the coefficient data, perform orthogonal transform on the coefficient data to generate the orthogonal transform coefficient, and quantize the orthogonal transform coefficient to generate the quantization coefficient; and a coding unit configured to encode the quantization coefficient generated by the transform quantization unit to generate coded data, in which the inverse quantization unit is configured to inversely quantize the quantization coefficient generated by the transform quantization unit.

(19) The image processing apparatus described in (18), further including:

a calculation unit configured to subtract prediction data of the image data from the image data to generate prediction residual data, in which the transform quantization unit is configured to perform adaptive color transform on the prediction residual data generated by the calculation unit by a lossless method to generate the coefficient data, orthogonally transform the coefficient data to generate the orthogonal transform coefficient, and quantize the orthogonal transform coefficient to generate the quantization coefficient.

(20) An image processing method, including:

clipping coefficient data subjected to lossless adaptive color transform at a level based on a bit depth of the coefficient data; and performing inverse adaptive color transform on the coefficient data clipped at the level by the lossless method.

REFERENCE SIGNS LIST

100 Inverse adaptive color transform device
101 Selection unit
102 Clip processing unit
103 Inverse YCgCo-R transform unit
200 Inverse quantization inverse transform device
201 Inverse quantization unit
202 Inverse orthogonal transform unit
203 Inverse adaptive color transform unit
400 Image decoding device
401 Control unit
412 Decoding unit
413 Inverse quantization inverse transform unit
414 Calculation unit
415 In-loop filter unit
416 Rearrangement buffer
417 Frame memory
418 Prediction unit
500 Image coding device
501 Control unit
511 Rearrangement buffer
512 Calculation unit
313 Transform quantization unit
514 Coding unit
515 Storage buffer
516 Inverse quantization inverse transform unit
517 Calculation unit
518 In-loop filter unit
519 Frame memory
520 Prediction unit
521 Rate control unit

The invention claimed is:

1. An image processing apparatus, comprising:
   circuitry configured to:
      clip coefficient data subjected to lossless adaptive color transform at a level based on a bit depth of the coefficient data;
      clip a luminance component and a color component of the coefficient data at the same level as each other;
      clip the luminance component and the color component of the coefficient data with, as an upper bound, a value obtained by subtracting 1 from a power of 2 with a value obtained by adding 1 to the bit depth as a power index;
      clips the luminance component and the color component of the coefficient data with, as a lower bound, a value obtained by multiplying −1 by a power of 2 with a value obtained by adding 1 to the bit depth as a power index; and
      perform inverse adaptive color transform on the coefficient data clipped at the level by the lossless method.

2. The image processing apparatus according to claim 1, wherein
   the level is a value based on the bit depth and a dynamic range of a buffer that stores the coefficient data.

3. The image processing apparatus according to claim 1, wherein
   the circuitry is configured to
   clip a luminance component of the coefficient data at a first level, and
   clip a color component of the coefficient data at a second level.

4. The image processing apparatus according to claim 3, wherein
   the second level has a wider difference between upper and lower bounds than that of the first level.

5. The image processing apparatus according to claim 4, wherein
   the circuitry configured to
   clip the luminance component of the coefficient data with, as an upper bound, a first value obtained by subtracting 1 from a power of 2 with the bit depth as a power index,
   clips the luminance component of the coefficient data with, as a lower bound, a second value obtained by multiplying-1 by a power of 2 with the bit depth as a power index,
   clips the color component of the coefficient data with, as an upper bound, a third value obtained by subtracting 1 from a power of 2 with a value obtained by adding 1 to the bit depth as a power index, and clips the color component of the coefficient data with, as a lower bound, a fourth value obtained by multiplying-1 by a power of 2 with a value obtained by adding 1 to the bit depth as a power index.

6. The image processing apparatus according to claim 3, wherein
the first level and the second level are values based on the bit depth and a dynamic range of a buffer that stores the coefficient data.

7. The image processing apparatus according to claim 6, wherein
the circuitry is configured to
clip the luminance component of the coefficient data with, as an upper bound, a first value obtained by subtracting 1 from a power of 2 with a smaller one of the bit depth and a second value obtained by subtracting 1 from the dynamic range of the buffer as a power index,
clips the luminance component of the coefficient data with, as a lower bound, a third value obtained by multiplying-1 by a power of 2 with a smaller one of the bit depth and a fourth value obtained by subtracting 1 from the dynamic range of the buffer as the power index,
clip the color component of the coefficient data with, as an upper bound, a fifth value obtained by subtracting 1 from a power of 2 with a smaller one of a value obtained by adding 1 to the bit depth and a sixth value obtained by subtracting 1 from the dynamic range of the buffer as the power index, and
clip the color component of the coefficient data with, as a lower bound, a seventh value obtained by multiplying-1 by a power of 2 with a smaller one of a eighth value obtained by adding 1 to the bit depth and a ninth value obtained by subtracting 1 from the dynamic range of the buffer as the power index.

8. The image processing apparatus according to claim 1, wherein
the level is a value based on a dynamic range of a buffer that stores the coefficient data.

9. The image processing apparatus according to claim 8, wherein
the circuitry is configured to
clip a luminance component and a color component of the coefficient data with, as an upper bound, a first value obtained by subtracting 1 from a power of 2 with a second value obtained by subtracting 1 from the dynamic range of the buffer as a power index, and
clip the luminance component and the color component of the coefficient data with, as a lower bound, a third value obtained by multiplying-1 by a power of 2 with a fourth value obtained by subtracting 1 from the dynamic range of the buffer as a power index.

10. The image processing apparatus according to claim 1, wherein the circuitry is further configured to:
inversely orthogonally transform an orthogonal transform coefficient to generate the coefficient data subjected to lossless adaptive color transform, and
clip the coefficient data generated at the level.

11. The image processing apparatus according to claim 10, wherein the circuitry is further configured to:
inversely quantize a quantization coefficient and generate the orthogonal transform coefficient, and
inversely orthogonally transform the orthogonal transform coefficient generated.

12. The image processing apparatus according to claim 11, wherein the circuitry is further configured to:
decode coded data and generate the quantization coefficient, and
inversely quantize the quantization coefficient generated.

13. The image processing apparatus according to claim 12, wherein the circuitry is configured to
perform inverse adaptive color transform on the coefficient data clipped at the level by the lossless method to generate prediction residual data of image data, and
add prediction data of the image data to the prediction residual data generated to generate the image data.

14. The image processing apparatus according to claim 11, wherein the circuitry is further configured to:
perform adaptive color transform on image data by a lossless method to generate the coefficient data, perform orthogonal transform on the coefficient data to generate the orthogonal transform coefficient, and quantize the orthogonal transform coefficient to generate the quantization coefficient;
encode the quantization coefficient generated to generate coded data; and
to inversely quantize the quantization coefficient generated.

15. The image processing apparatus according to claim 14, wherein the circuitry is further configured to:
subtract prediction data of the image data from the image data to generate prediction residual data,
perform adaptive color transform on the prediction residual data generated by a lossless method to generate the coefficient data,
orthogonally transform the coefficient data to generate the orthogonal transform coefficient, and
quantize the orthogonal transform coefficient to generate the quantization coefficient.

16. An image processing apparatus, comprising:
circuitry configured to:
clip coefficient data subjected to lossless adaptive color transform at a level based on a bit depth of the coefficient data;
clip a luminance component and a color component of the coefficient data at the same level as each other, wherein
the level is a value based on the bit depth and a dynamic range of a buffer that stores the coefficient data, and
the level is a value derived using a smaller one of a value based on the bit depth and not based on the dynamic range of the buffer and a value not based on the bit depth and based on the dynamic range of the buffer; and
perform inverse adaptive color transform on the coefficient data clipped at the level by the clip processing unit by the lossless method.

17. The image processing apparatus according to claim 16, wherein
the circuitry is configured to
clip the luminance component and the color component of the coefficient data with, as an upper bound, a value obtained by subtracting 1 from a power of 2 with a smaller one of a value obtained by adding 1 to the bit depth and a value obtained by subtracting 1 from the dynamic range of the buffer as a power index, and
clip the luminance component and the color component of the coefficient data with, as a lower bound, a value obtained by multiplying-1 by a power of 2 with a smaller one of a value obtained by adding 1 to the bit depth and a value obtained by subtracting 1 from the dynamic range of the buffer as a power index.

18. An image processing method, comprising:

clipping coefficient data subjected to lossless adaptive color transform at a level based on a bit depth of the coefficient data;

clipping a luminance component and a color component of the coefficient data at the same level as each other, wherein the level is a value based on the bit depth and a dynamic range of a buffer that stores the coefficient data, and the level is a value derived using a smaller one of a value based on the bit depth and not based on the dynamic range of the buffer and a value not based on the bit depth and based on the dynamic range of the buffer; and performing inverse adaptive color transform on the coefficient data clipped at the level by the lossless method.

19. The image processing method according to claim 18, further comprising clipping the luminance component and the color component of the coefficient data with, as an upper bound, a value obtained by subtracting 1 from a power of 2 with a smaller one of a value obtained by adding 1 to the bit depth and a value obtained by subtracting 1 from the dynamic range of the buffer as a power index, and clipping the clipping the luminance component and the color component of the coefficient data with, as a lower bound, a value obtained by multiplying −1 by a power of 2 with a smaller one of a value obtained by adding 1 to the bit depth and a value obtained by subtracting 1 from the dynamic range of the buffer as a power index.

20. The image processing method according to claim 18, wherein the level is a value based on the bit depth and a dynamic range of a buffer that stores the coefficient data.

* * * * *